(12) United States Patent
Damask

(10) Patent No.: US 6,577,445 B1
(45) Date of Patent: Jun. 10, 2003

(54) COMPOSITE BIREFRINGENT CRYSTAL AND FILTER

(75) Inventor: Jay N. Damask, Annapolis, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 106 days.

(21) Appl. No.: 09/664,579

(22) Filed: Sep. 18, 2000

(51) Int. Cl.[7] .................................................. G02B 5/30
(52) U.S. Cl. ...................... 359/497; 359/122; 359/127; 359/483; 359/488; 359/494; 359/497
(58) Field of Search ................................ 359/122, 127, 359/483, 488, 494, 495, 497

(56) References Cited

U.S. PATENT DOCUMENTS 4,987,567 A  1/1991  Buhrer ........................ 359/127

*Primary Examiner*—Cassandra Spyrou
*Assistant Examiner*—Craig Curtis
(74) *Attorney, Agent, or Firm*—John A. Caccuro

(57) ABSTRACT

A stack of two or more birefringent crystals having complimentary properties is arranged to have zero net beam walk-off at off-normal incidence and a finite free-spectral range. In another embodiment, the birefringent crystal materials are selected to provide reduced temperature dependence. The result is an optically and mechanically stable composite birefringent crystal unit. A variety of folded birefringent filters are implemented using the composite birefringent crystal.

6 Claims, 21 Drawing Sheets

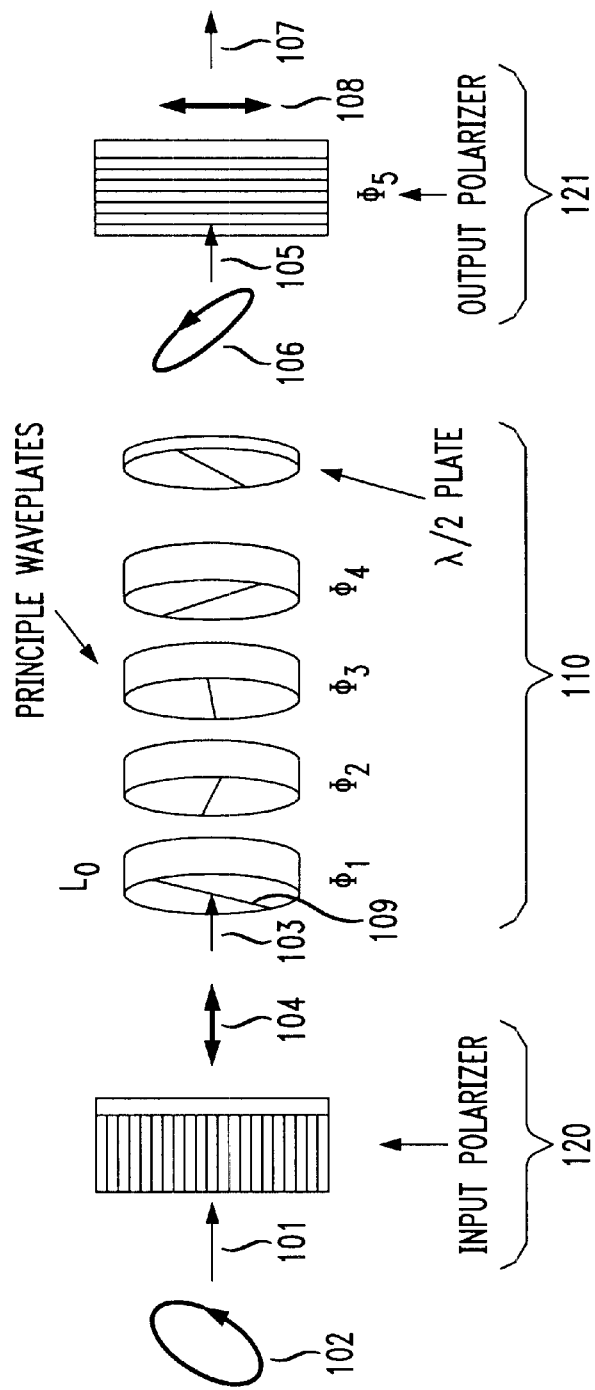

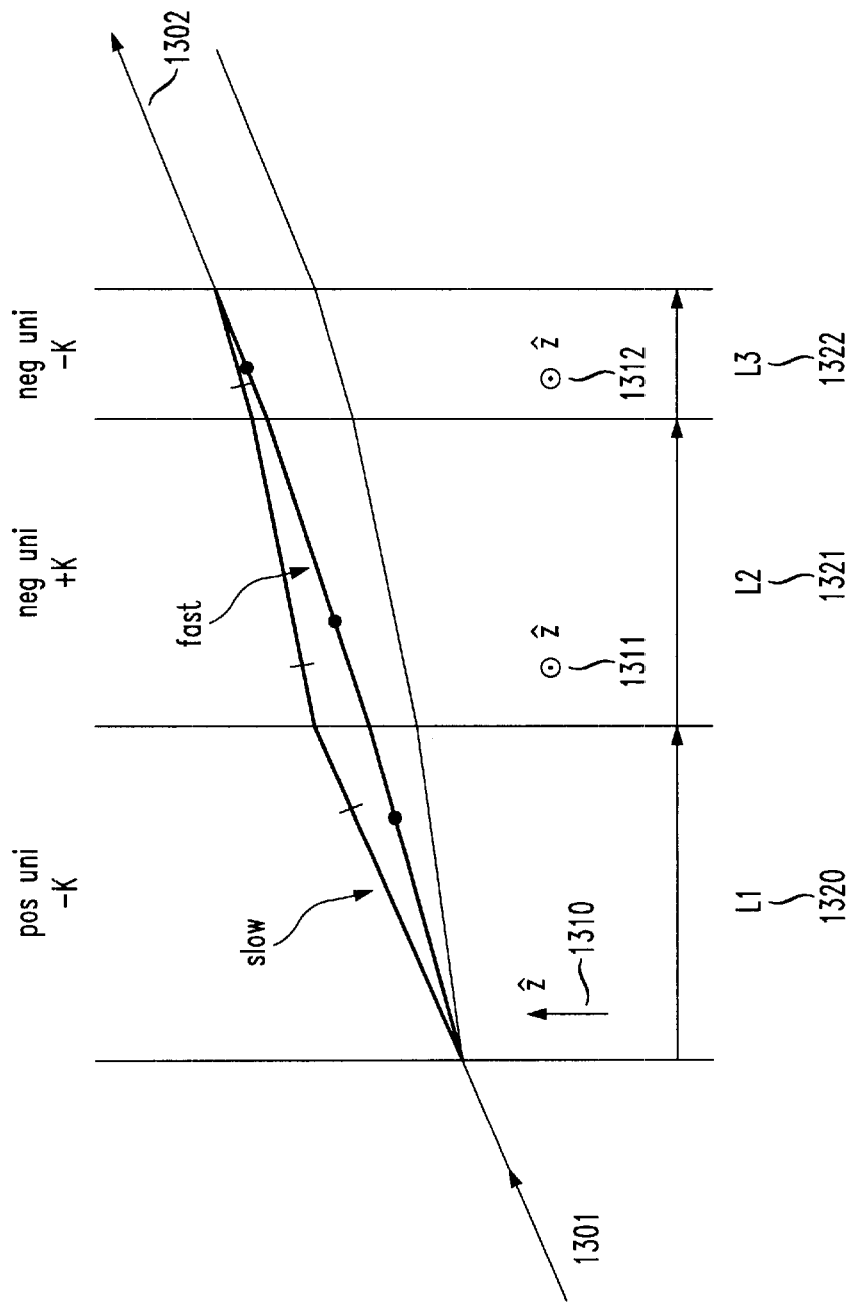

FIG. 17
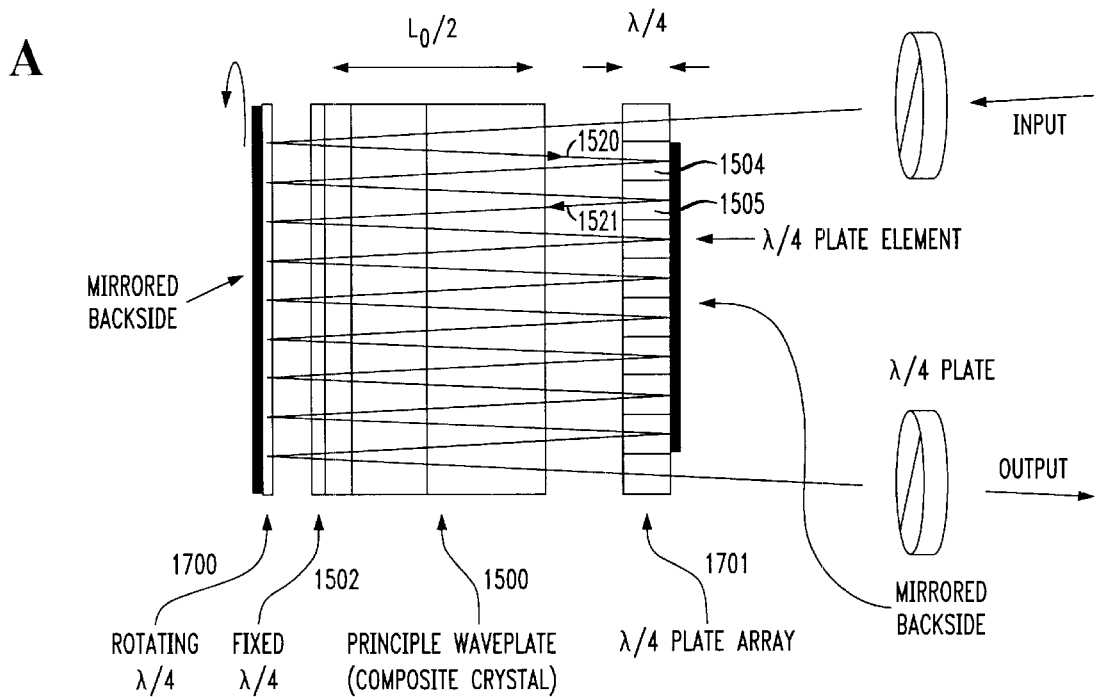
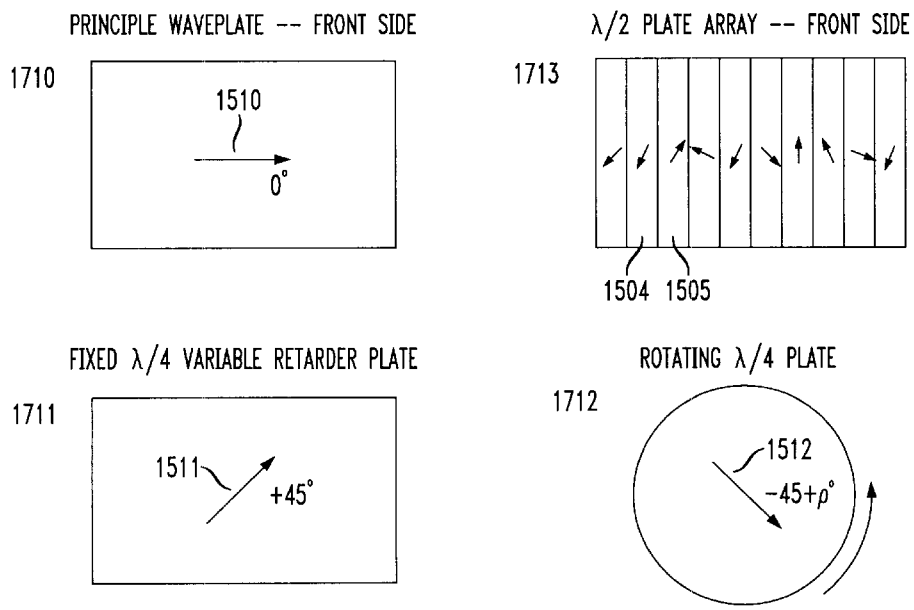

COMPOSITE BIREFRINGENT CRYSTAL AND FILTER

CROSS-REFERENCE TO RELATED APPLICATIONS

Related subject matter is disclosed in the applications filed on Mar. 21, 2000 and entitled "POLARIZATION DIVERSITY FOR BIREFRINGENT FILTERS" and "DOUBLE-PASS POLARIZATION DIVERSIFIED BIREFRINGENT FILTER," Ser. Nos. 09/532,143 and 09/532,150, respectively, both filed by J. N. Damask and C. R. Doerr and both assigned to the same Assignee.

FIELD OF THE INVENTION

The invention relates generally to birefringent crystals and filters and, more particularly, to a composite birefringent crystal and a folded birefringent filter using such a composite birefringent crystal.

BACKGROUND OF THE INVENTION

The birefringent filter of FIG. 1($a,b$) is a construct well-known to astronomers since the 1930s. Lyot [1] and Evans [2] used such filters in combination with their telescopes to image the sun within narrow frequency bands, for example isolating the helium line to provide for the imaging of helium gas dynamics on the sun's surface. (Note in this specification, a reference to another document is designated by a number in brackets to identify its location in a list of references found in the Appendix) The birefringent filter appears to be introduced to optical telecommunications in the late 1980s by C. Burher, who demonstrated a simple periodic filter [3, 4, 5]. In the late 1990s the birefringent filter has become a lead contender for the attractive operation of interleaving and de-interleaving DWDM wavelengths.

A birefringent filter proper, 110 or 111, rotates the state of polarization (SOP), 106, at the output, 105, with respect to the input, 103, as a function of the optical frequency. The frequency response of the induced polarization rotation is tailored by the relative orientation of the ordinary birefringent axes, 109, from one birefringent element to the next. The relative orientations can be calculated using filter-synthesis procedures as described in Harris [6]. Advantageous filter designs can be realized by use of all birefringent elements having the same length, e.g. 110, or all birefringent elements having integral-multiple lengths of a unit length, e.g. 111.

In order to generate an amplitude response from the polarization rotation produced by a birefringent filter proper, Lyot and Evans both added input and output polarizers, 120 and 121. In this manner, input light 101 with input SOP 102 is first polarized to a linear state, 104. Birefringent-filter proper 110 or 111 receives linearly polarized input beam 103 and produces in general an elliptically polarized beam 105 with output SOP 106. Output polarizer 121 then analyzes the SOP 106 and produces linearly polarized beam 107 with SOP 108. As the optical frequency of input beam 101 changes, the output SOP 106 changes, producing an amplitude change of beam 107.

The use of polarizers for an optical telecommunications application is generally disadvantageous because of the polarization-dependent loss that results. Buhrer proposed and demonstrated the substitution of input and output polarizers with a polarization-diversity scheme. FIG. 2 illustratively shows the use of input polarization diversity 201 and output polarization diversity 202 elements in place of polarizers. Buhler's U.S. Pat. No. 4,987,567 [4] provides one such architecture. The above-referenced Damask and Doerr patents, Ser. Nos. 09/532,143 and 09/532,150, cover alternative schemes.

FIG. 2 illustrates input beam 101 with SOP 102 being split into two parallel yet offset beams 210 and 211 by input polarization diversity element 201. Beams 210 and 211 have polarizations 220 and 221 that may be either orthogonal or parallel, depending on the method of polarization diversity implemented. The clear aperture of the birefringent filter proper, 110, is designed large enough to accept both beams 210 and 211. Beams 212 and 213 are output from the filter with polarizations 222 and 223, which may be orthogonal or parallel, depending on the method of polarization diversity implemented. Output polarization diversity element 202 then combines the orthogonal polarization elements of each SOP, 222 and 223, creating beams 214 and 215 with SOPs 224 and 225. In this scheme, no optical power is in principle lost. The intensities of beams 214 and 215 alternate as a function of input optical frequency such that the sum of their optical powers remains constant.

Whether input and output polarizers or polarization diversity elements are used to implement the transformation from SOP rotation to amplitude response, it is the core birefringent filter 110 which dictates the shape and periodicity of the frequency response of the filter. The relative orientations of the birefringent ordinary axes dictate the filter magnitude and phase response; the thickness of the birefringent plates dictates the periodicity of the response. The number of birefringent elements required to realize a specific filter shape dependents on the filter specifics. Typically, though, three or more stages are used.

As a practical matter, the unit crystal length of any one birefringent element, Lo, is on the order of 17.65 mm to achieve a frequency periodicity, called the free-spectral range (FSR), of 100 GHz using calcite as the birefringent material. A three-stage filter is then 52.95 mm long. Many important filters require more stages. Accordingly, as a practical matter, the length and material cost of the birefringent filter proper can be large. Moreover, the length tolerance from one birefringent element to the next is stringent. To shift the response of any one birefringent element by one FSR, the crystal length need change 100 GHz/193 THz, or about 0.05%, assuming an approximate and illustrative 1545 nm optical wavelength. Therefore the length control for calcite elements must be a small fraction of 0.05% of 17.65 mm, or less then about 9 microns. Typically crystal length can be controlled to about +/−3 microns. The impact of small variations of crystal length along a birefringent filter is to distort the desired spectral response.

What is needed is a birefringent filter design that overcomes the above limitations of existing designs.

SUMMARY OF THE INVENTION

In accordance with the present invention, the problems of prior birefringent filter designs are overcome using a folded birefringent filter incorporating a multi-pass architecture. More generally, I have invented a novel composite birefringent crystal which includes a stack of two or more birefringent crystals having complimentary properties arranged to have zero net beam walk-off at off-normal beam incidence and a finite free-spectral range. In another embodiment, the birefringent crystal materials are selected to provide reduced temperature dependence. The result is an optically and mechanically stable composite birefringent crystal. In one application, a folded birefringent filter is implemented so that an input beam has multiple transits of the composite birefringent crystal. The folded birefringent filter uses the composite birefringent crystal together with one or more highly reflective devices and waveplates arrays to form a variety of single- or multiple-order folded birefringent filters.

More particularly, my composite birefringent crystal comprises:

a. a stack of two or more uniaxial birefringent crystals, each having front and back substantively parallel surfaces in which plane the crystalline extraordinary axis substantively lies and each located one behind the next with surfaces parallel, which receives an input optical beam that is non-normal to the front surface of the first crystal and produces from the back surface of the last crystal first and second orthogonally polarized optical beams;

b. where at least one crystal in the stack exhibits positive uniaxial birefringence;

c. where at least one crystal in the stack exhibits negative uniaxial birefringence;

d. where the extraordinary axis of at least one of the positive uniaxial crystals and the extraordinary axis of at least one of the negative uniaxial crystals have non-parallel alignment;

e. where with respect to the length of the first crystal, the ratio of the length of each subsequent crystal to the length of the first crystal is selected to produce at the bottom surface of the last crystal
   i. zero net spatial displacement between first and second orthogonally polarized optical beams, and
   ii. temporal delay between first and second orthogonally polarized optical beams.

BRIEF DESCRIPTION OF THE DRAWINGS

In the drawings

FIG. 1a shows an illustration of a prior art single-order cascaded birefringent filter with input and output polarizers;

FIG. 3b shows a single-order unfolded birefringent filter equivalent to the filter of FIG. 3a;

FIG. 6b illustratively shows the e-axis orientations and reflection patterns located at five planes within the cavity of the filter of FIG. 6a;

FIG. 13 illustrates a cross-section of three birefringent crystals;

FIG. 14a illustrates a folded filter with uniform principal crystal thicknesses and FIG. 14b illustrates a folded filter with multiple principal waveplate thicknesses;

FIG. 17a illustrates the folded filter architecture of FIG. 14a with two additional elements including a fixed QWP located parallel to and behind the composite-crystal principal waveplate and a rotatable QWP located parallel to and behind the fixed QWP; and the composite-crystal principal waveplate and a rotatable QWP located parallel to and behind the fixed QWP; and FIG. 17b illustrates the relative e-axis orientations of the elements in the tunable folded filter.

DETAILED DESCRIPTION

The elements of a birefringent filter proper are uniaxial birefringent crystals. Typical uniaxial birefringent crystals are mica, calcite, crystalline quartz, and rutile. A uniaxial crystal is characterized by two of three orthogonal crystalline axes possessing the same refractive index and the remaining axis possessing a different refractive index. The two common axes are called the ordinary axes and the dissimilar axis is called the extraordinary axis. A crystal is referred to as positive or negative uniaxial depending on whether the refractive index of the extraordinary axis is greater than or less than the ordinary refractive indices, respectively.

The cut of the crystal for the purposes of a birefringent filter element is such that the extraordinary axis, or e-axis, is in the plane of the crystal face onto which optical radiation is incident. This crystal cut is herein referred to as a waveplate. In the waveplate orientation, optical radiation which propagates through the crystal body, is split into two distinct linear polarizations: one which is aligned to the e-axis and one which is aligned to the orthogonal ordinary axis, or o-axis. Since the refractive indices of the e- and o-axes differ, the phase and group velocities of the linearly polarized waves as they travel through the crystal differ. It is common to refer to the axes as fast and slow. However, the correspondence between fast and slow, and ordinary and extraordinary, depends of the sign of the crystal. A positive uniaxial crystal exhibits $n_e > n_o$, so the e-axis is the slow axis and the o-axis is the fast axis. A negative uniaxial crystal exhibits $n_o > n_e$, so the e-axis is the fast axis and the o-axis is the slow axis.

Figure 3A:
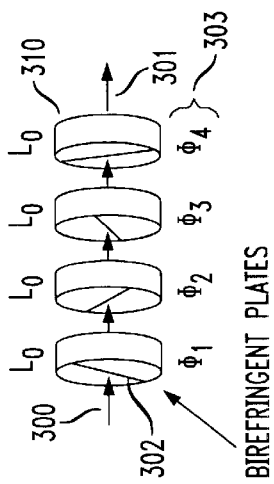
FIG. 3a shows an illustration of a single-order cascaded birefringent filter.

A birefringent filter requires the interleaving of two optical effects, FIG. 3a. First, the optical power on two orthogonal polarization axes must be mixed by projection onto a waveplate face. The azimuth orientation of the e-axis, 302, with respect to the incident SOP, 300, dictates the mixture of the optical power. Second, differential group delay (DGD), or the time-of-flight difference, must accrue between the two orthogonal linear polarization axes. DGD must accrue from one SOP projection to the next. Each waveplate 310 in FIG. 3a has, for generality, a distinct azimuth orientation of the e-axis, 302, and has the same crystal length. Each crystal face mixes the incident optical power on the two orthogonal polarization axes and each crystal length generates the requisite DGD.

In order to distinguish the various crystal functions in the following, the crystal waveplates 310 illustrated to in FIG. 3a will hereafter be referred to as principle birefringent plates, or principle plates for short. A principle plate is a waveplate that is thick enough to produce the desired periodic frequency-response.

Unfolded Birefringent Filters

Figure 3B:
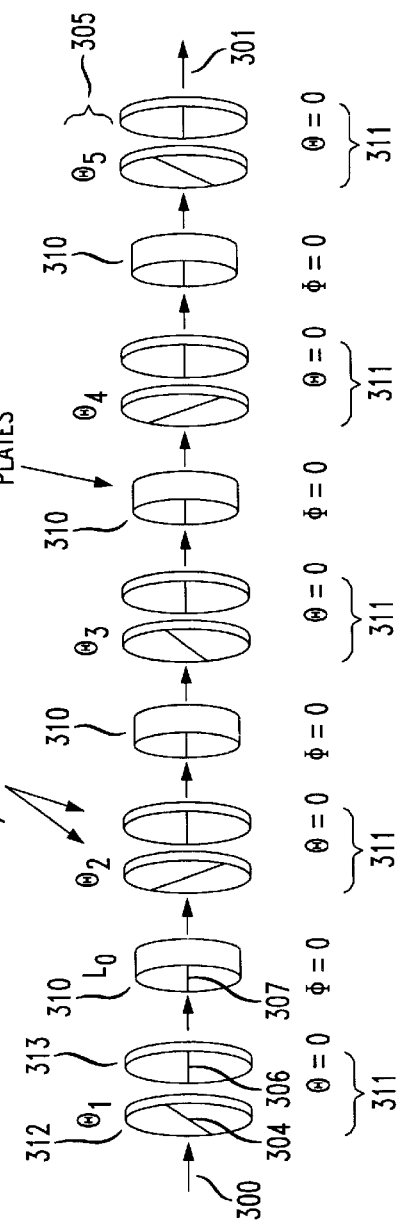

FIG. 3a illustrates how a typical birefringent filter is constructed. Such construction is potentially simple and thus promises some advantage. However, an alternative and optically equivalent construction is illustrated in FIG. 3b. In the present case, each principal waveplate 310 has its azimuth orientation of the e-axis 307 rotated to a common position, hereafter referred to as the zero position. Between each principle waveplate and at each end are added half-wave waveplates (HWP) pairs 311. A single HWP refers to a birefringent waveplate that is very thin—ideally zero. While there is no appreciable accumulation of DGD through a HWP, the input SOP is mirror-imaged about the e-axis of the HWP, which is similar to a SOP rotation. Each HWP pair 311 is composed to two distinct HWPs 312 and 313. Each HWP 312 in the cascade is rotated to a predetermined azimuth orientation 304 while all HWPs 313 are rotated to zero orientation 306, which aligns with the zero orientation 307 of principle waveplates 310.

The cascade of HWP pairs and principle waveplates separates out the two component functions of a birefringent filter: the SOP rotation is performed by the lead HWPs 312 and the DGD accumulation is performed by the principle waveplates 310. The azimuth orientations 305 of the lead HWPs 312 is calculated from the azimuth orientations 303 of the principal waveplates 310 from FIG. 3a. The relation between θ 305 and φ 303 is $$\theta_{k+1} = (\phi_{k+1} - \phi_k)/2 \quad (1a)$$

$$\phi_0 = 0 \quad (1b)$$

$$\phi_{N+1} = 0 \quad (1c)$$

which amounts to simply one-half of the difference between e-axis azimuth angles between adjacent crystals 310 of FIG. 3a.

The purpose of zero-oriented HWPs 313 in FIG. 3b is subtle: replacement of rotated principle waveplates 310 of FIG. 3a with rotated HWPs 312 of FIG. 3b both shifts the mechanics of SOP rotation from rotation to mirror-image, and shifts the frequency response of the following principle waveplate. In order to correct for these effects to establish rigorous equivalence between FIGS. 3a and 3b, additional zero-orientated HWPs 313 must be added to the cascade. In the instance of FIG. 3b where all principle waveplates share the same length, HWPs 313 may be systematically "absorbed" by the principle waveplates 310 with the impact of shifting the frequency-response of the birefringent filter proper by one-half of the FSR.

Figure 1B:
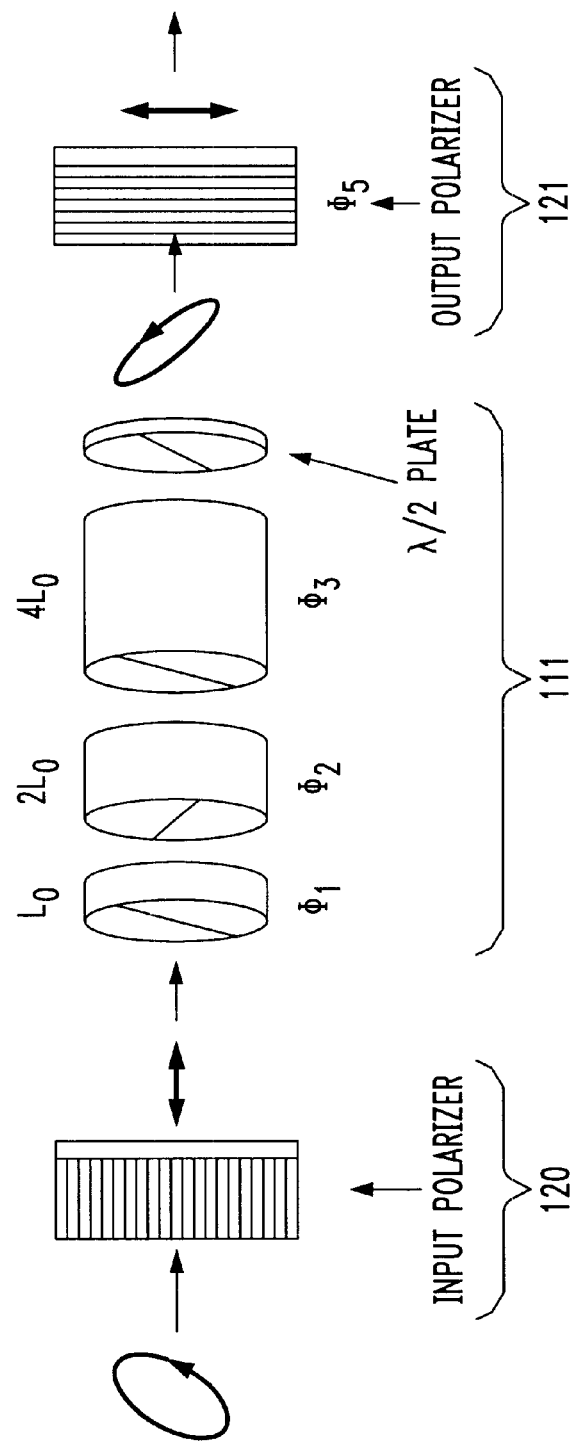
FIG. 1b shows an illustration of a prior art multiple-order cascaded birefringent filter with input and output polarizers.

The cascade of HWPs and principle waveplates as in FIG. 3b is hereafter referred to as an unfolded birefringent filter, equivalent to FIG. 3a. The construction of the unfolded filter equivalent to FIG. 1b, where the birefringent crystals are integral multiples of a unit length, requires an additional step.

Figure 4A:
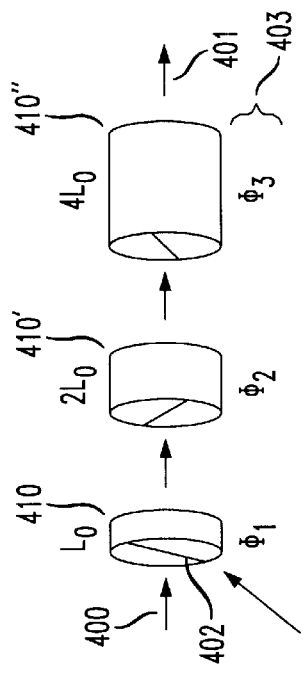
FIG. 4a shows a birefringent filter proper with multiple principle waveplate thicknesses.

FIG. 4a illustrates a birefringent filter proper with multiple principal waveplate thicknesses Lo, 2Lo, and 4Lo. All principle waveplate thicknesses are an integral multiple of a unit thickness Lo. An optical beam 400 is input on first principle waveplate 410 and subsequently transits through principal waveplates 410, 410', and 410". Each principle waveplate is rotated along the azimuth direction 402 to the appropriate angle. Angles 403 determine the frequency response of the filter.

Figure 4B:
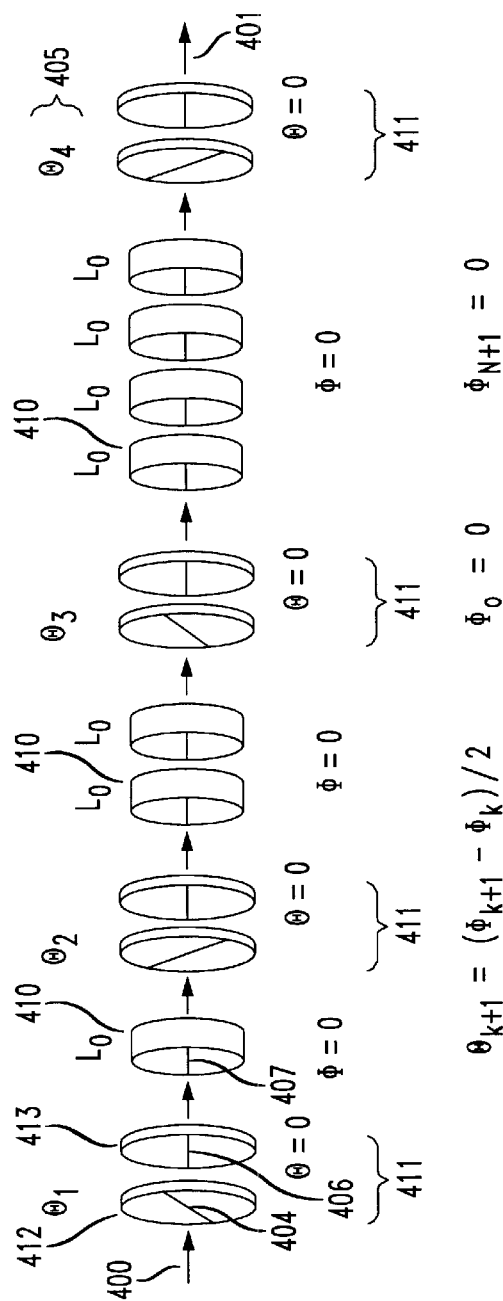
FIG. 4b shows a first unfolded construction of the filter of FIG. 4a using half-wave waveplate (HWP) pairs.

FIG. 4b illustrates a first unfolded construction wherein HWP pairs 411 are utilized to perform the requisite SOP rotation between principle waveplates. HWP pairs are located between each principle waveplate and at either end of the cascade. Moreover, the principle waveplates 410, 410', 410" are divided into integral numbers of unit-thickness waveplates; following FIG. 4b waveplate 410 is undivided, 410' is divided into two unit waveplates, and 410" is divided into four unit waveplates. All principle waveplates are thus composed of an integral number of principle waveplates 410. The e-axes 407 of the principle waveplates sections 410 are rotated to the zero position while the e-axes 404 of the lead HWPs 412 are rotated according to Eqs. (1a–c), 405. The e-axes 406 of the trailing HWPs 413 are rotated to the zero position.

Figure 4C:
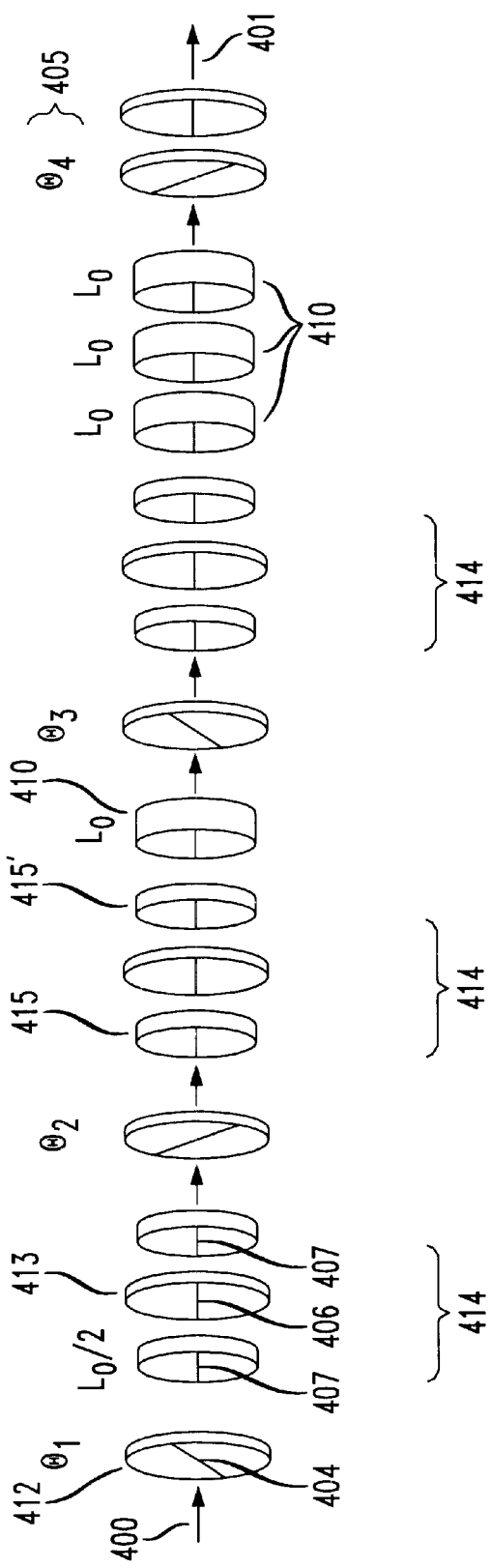
FIG. 4c shows a more advantageous unfolded construction of the filter of FIG. 4a using half-wave waveplate (HWP) pairs.

Unlike the unfolded cascade of FIG. 3b, where trailing HWPs 313 may be excluded with only a consequent shifting of the filter frequency response by one-half of a FSR, the exclusion of trailing HWPs 413 will alter the entire shape of the filter frequency response. Therefore a means to incorporate the trailing HWPs 413 is required. An advantageous manner in which to incorporate HWPs 413 into the unfolded filter cascade is illustrated in FIG. 4c. Each unit-length principle waveplate that immediately follows each trailing HWP 413 is first split in two equal-length sections 407 and 407'. The azimuth e-axis orientation is unaltered. Next, each trailing HWP 413 is relocated to reside between each split section 407 and 407'. The composite of first split principle waveplate 407, first HWP 406', and second split principle waveplate 407' creates a symmetric section 414. The transformation from FIG. 4b to FIG. 4c does not alter the azimuth rotations 404, 405, 406, or 407.

FIGS. 3b and 4c are unfolded equivalents of the birefringent filters illustrated in FIGS. 3a and 4a. Both of these unfolded equivalents may now be folded. Folding of either filter does not change the sequence of transformations an optical beam experiences during transit of the filter; rather the physical length is reduced and the ease of manufacture is simplified. In the following the various principle waveplates will be substituted with a single, common principle waveplate (CPWP).

Folded Filter Basic Architecture

Figure 5A:
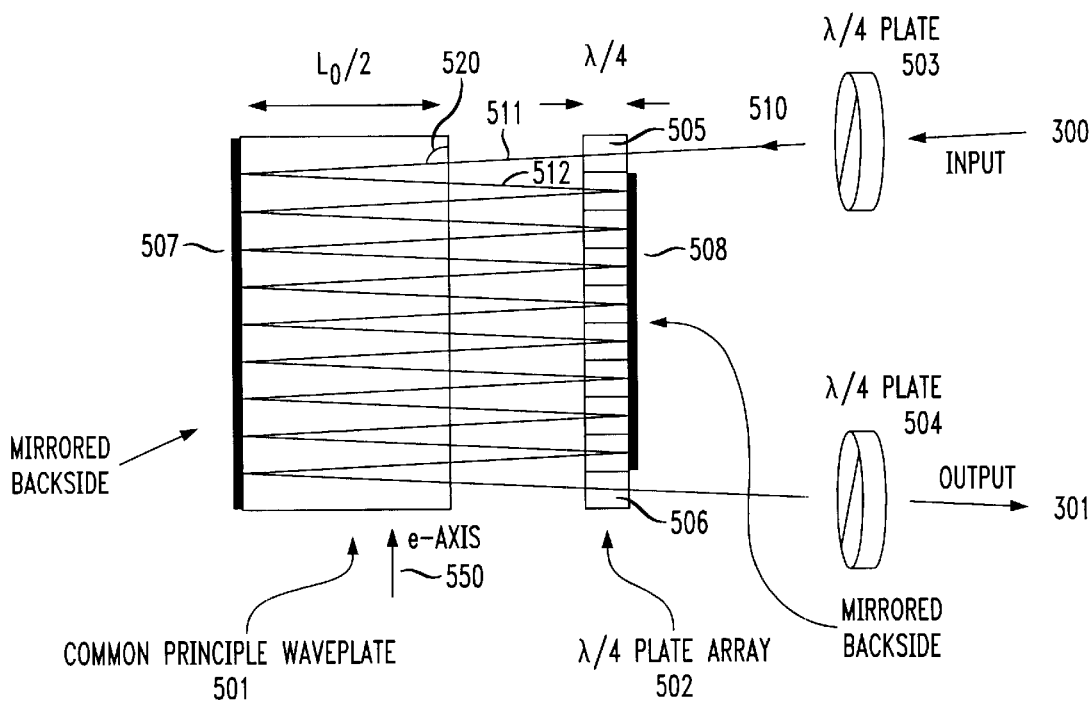
FIG. 5a illustratively shows a folded birefringent filter equivalent to FIG. 3b.

FIG. 5a illustrates a folded birefringent filter that is equivalent in principle to FIG. 3b. The filter of FIG. 5a contains ten stages rather than four and removes the HWPs 313 with consequent albeit immaterial shifting of the filter frequency response by one-half FSR. A cavity is formed between a CPWP 501 whose length is one-half the length of the principle waveplates of an equivalent unfolded filter, and a "quarter-wave plate array", or QWP array 502. The e-axis 550 of the CPWP 501 as illustrated is oriented vertically. An input optical beam 300 is first inclined from the horizontal so that, as the light travels through the filter cavity, a zig-zag pattern is generated. The CPWP has its backside face mirror-coated 507 and the QWP array 502, too, has its backside mirror coated 508 with the exception of the edge two plates 505 and 506. Quarter-wave waveplates are substituted for half-wave waveplates because a full half-wave effect is generated via the double-pass through the QWP. To account for the quarter-wave shortfall of edge plates 505 and 506, external QWPs 503 and 504 are added. Note that the edge plates 505 and 506 may be combined with the QWPs 503 and 504, respectively, to form half-wave plates.

Thus, inclined input beam 300 passed through first QWP 503 and edge QWP 505 and enters the cavity as beam 511. Cavity beam 511 is inclined with respect to the CPWP by angle 520. The transit to and from the backside mirror 507 generates the requisite one-pass DGD, equivalent to transit of elements 310 of FIG. 3b. Emergent beam 512 is then incident on one element of the QWP array, thereby rotating its SOP by a prescribed amount. The backside mirror 508 reflects beam 512 back to the CPWP for additional passes. The double-transit of one QWP element is equivalent to transit of elements 312 of FIG. 3b. After transiting the cavity as thus and exiting via edge QWP 506 and QWP 504, the output beam 301 emerges.

Figure 5B:
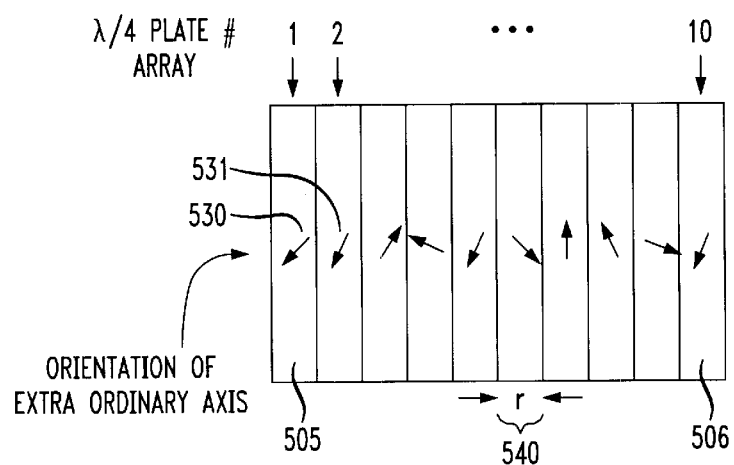
FIG. 5b shows the face of an illustrative quarter-wave plate (QWP) array.

FIG. 5b illustrates the face of a representative QWP array 502. Several separate quarter-wave plates are cut so that their perimeter is rectangular but their e-axis, 530 and 531, is orientated according to the prescribed sequence of angles, 305, necessary to generate the desired filter response. The center-to-center spacing of each plate 540 is determined by the overall geometry of the cavity. The edge plates 505 and 506 do not have backside mirror coating which the remaining interior plates do.

Figure 6A:
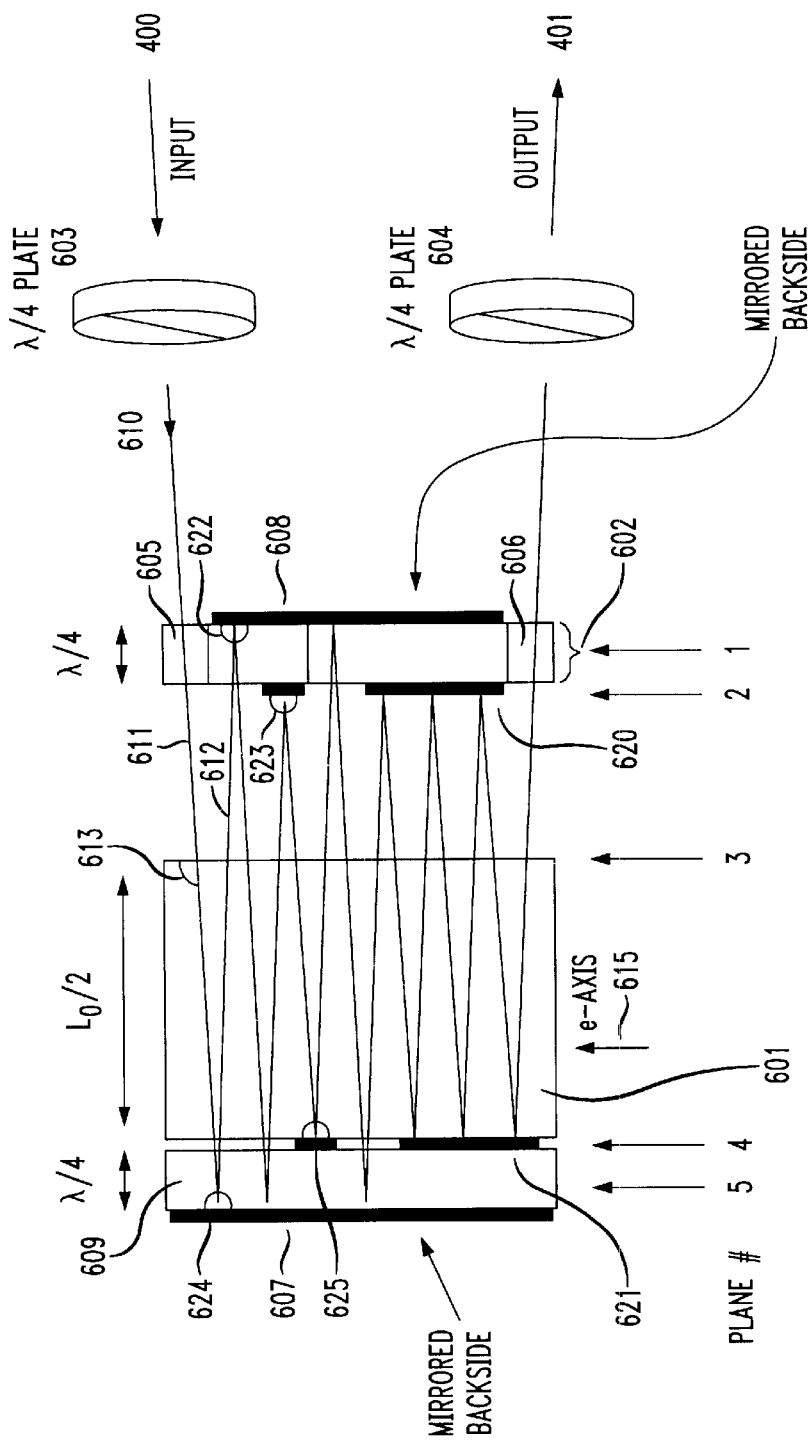
FIG. 6a shows a folded birefringent filter equivalent to FIG. 4c.

FIG. 6a illustrates a folded birefringent filter that is equivalent in principle to FIG. 4c. A cavity is formed between backside solid QWP 609, a CPWP 601 (whose length is one-half the length of the thinnest principle waveplate of an equivalent unfolded filter), and a "quarter-wave plate" array 602 (QWP array). The e-axis 615 of the CPWP 601 as illustrated is oriented vertically, as is the e-axis of the backside QWP 609. The backsides of solid QWP 609 and QWP array 602 are mirror coated with the exception of gaps at edge QWP locations 605 and 606. An input optical beam 400 is first inclined from the horizontal so that, as the light travels through the filter cavity, a zig-zag pattern is generated.

Unlike the folded filter of FIG. 5a, the present folded filter adds additional, segmented mirrors internal to the cavity. Patterned mirrors 620 and 621 selectively block the cavity optical beam 611 from transit of the respective folded half-wave waveplates.

Thus, inclined input beam 400 passed through first QWP 603 and edge QWP 605 and enters the cavity as beam 611. Cavity beam 611 is inclined with respect to the CPWP by angle 613. First transit of the CPWP must mimic the waveplate sequence 414 of FIG. 4c. Thus beam 611 transits the CPWP, solid QWP 609, is reflected at position 624, and transits CPWP in one pass, forming beam 612. This path is equivalent to transit of elements 413 and 410 of FIG. 4b. Beam 612 is reflected at position 622, thus transiting the second QWP array element. Element 414 must be produced again and therefore the optical beam transits both the CPWP and backside QWP again. At this point a second transit of the CPWP is required without intermediate SOP rotation. Thus the cavity beam is reflected at point 623, thereby being blocked from a second transit of the QWP array. The cavity beam is further blocked at point 625 from a second transit of backside QWP. Such selective blocking structure is necessary to construct the equivalence of the folded filter from the unfolded filter illustrated in FIG. 4c.

Figure 6B:
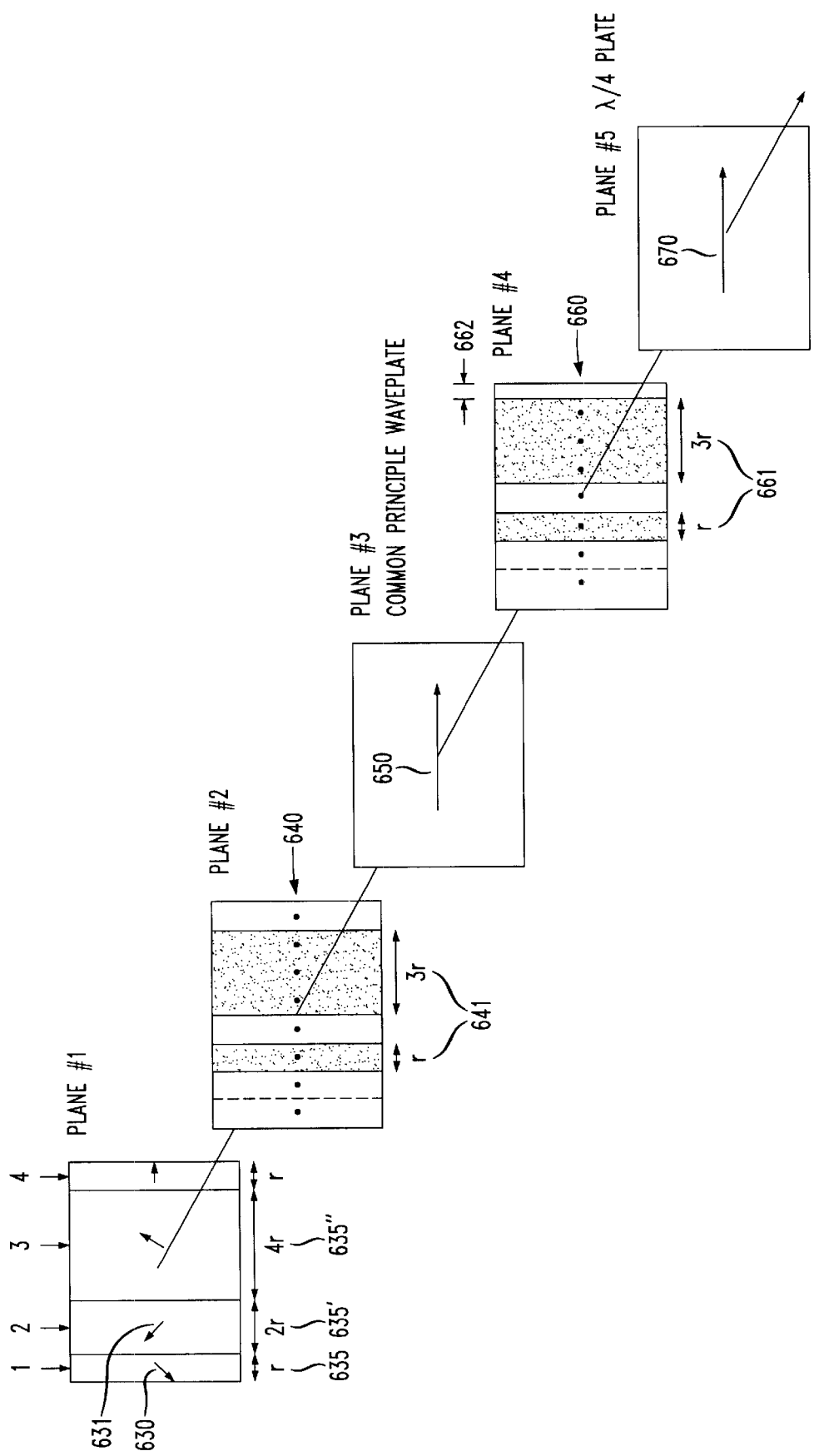

FIG. 6b illustrates the e-axis orientations and reflection patterns located at five planes within the cavity. At plane #1 QWPs are cut into rectangles with common height but integral widths. The e-axis of each plate, 630 and 631, is rotated according to sequence 405. Plates 635, 635′, and 635″ share a common unit width. On plane #2, regularly spaced beam positions 640 are indicated. Mirror stripes 641 selectively block the cavity beam from multiple QWP array passes. Plane #3 illustrates the zero orientation of the e-axis 650 of the CPWP. On plane #4, regularly spaced beam positions 660, offset by one-half beam displacement, are indicated. Mirror stripes 661 selectively block the cavity beam from multiple backside QWP passes. Plane #5 illustrates the zero orientation of the e-axis 670 of the backside QWP.

Composite Crystal Design for Zero Beam Walkoff

In accordance with another aspect of my invention, I have determined that the designs of FIGS. 5a and 6a only work when a composite, rather than single, birefringent crystal is used as the common principal waveplate 501 and 601. The structure of such a composite crystal is discussed in later paragraphs. The origin of the problem present in FIGS. 5a and 6a is first described. Without loss of generality, the folded filter of FIG. 5a alone will be referred to.

Figure 7:
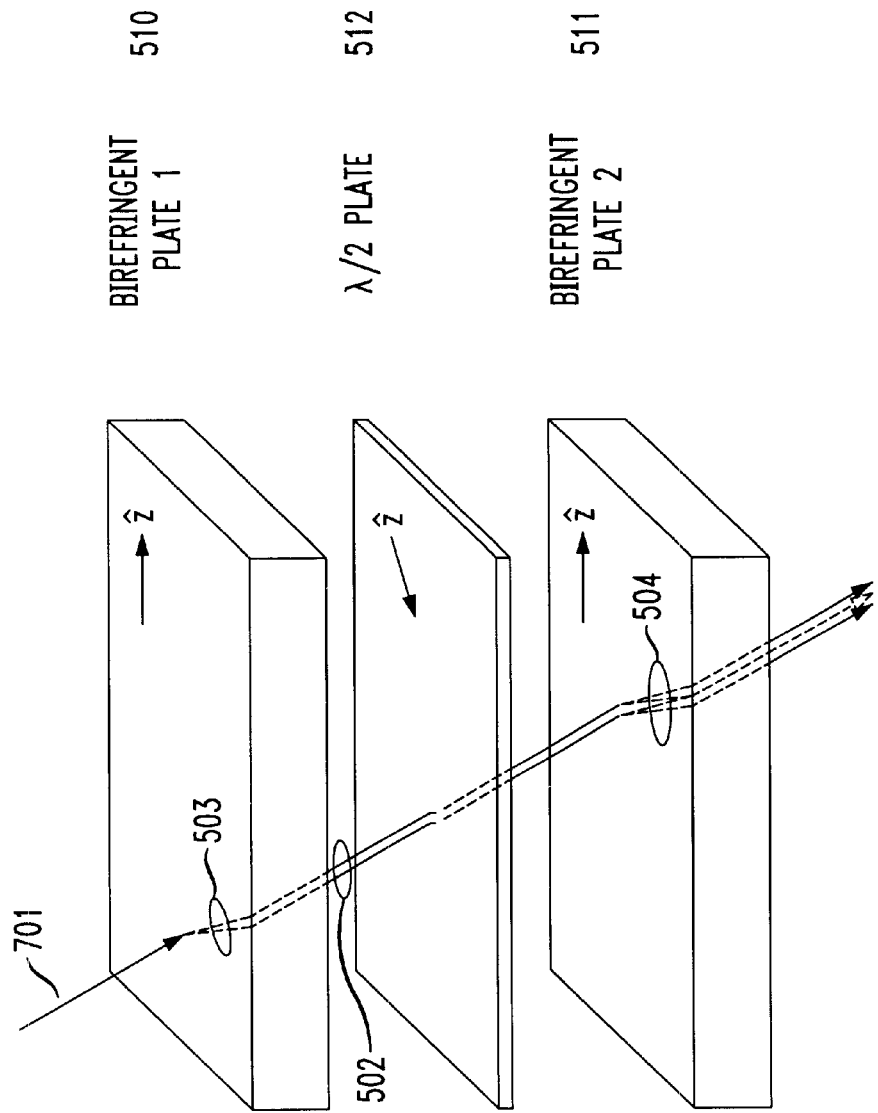
FIG. 7 illustrates the transit of input optical beam through the birefringent plates and the HWP.

The CPWP 501 is a uniaxial birefringent crystal cut so that the e-axis 550 is in the plane of the face through which cavity beam 511 transits and is oriented vertically in the figure. Once the input beam 511 at inclination 520 impinges the surface of the CPWP crystal, the incident SOP is resolved onto the orthogonal crystalline e- and o-axes. As these axes exhibit different refractive indices, the incident beam refracts into the crystal at two distinct angles. FIG. 7 illustrates the transit of input optical beam 701 through birefringent plates 710 and 711 and HWP 712. Upon incidence, beam 701 is split into two distinct beams 703 that propagate at different angles. Emergence of beams 702 results in two parallel, linearly polarized, and spatially offset beams. Transit of HWP 712 mixes the beam SOPs so that after incidence onto plate 711 each of the two input beams is further split into two beams, yielding four beams total.

Each pass through the common crystal (e.g., 501 of FIG. 5a) of a folded birefringent filter, after intermediate SOP rotation, divides each beam, yielding $2^N$ beams total after N stages with a binomial distribution in position displacement. Such geometric spatial division of the input beam results in high insertion loss, instability of that loss, and large polarization-dependent loss (PDL).

The problem is then how to overcome the detriment of beam walk-off. Certainly the presence of birefringence demands that orthogonal polarizations spatially separate. As part of the invention disclosed herein, the following shows how to engineer a stack of birefringent crystals having a finite FSR and zero net beam displacement.

Straightforward Approach

Figure 8A:
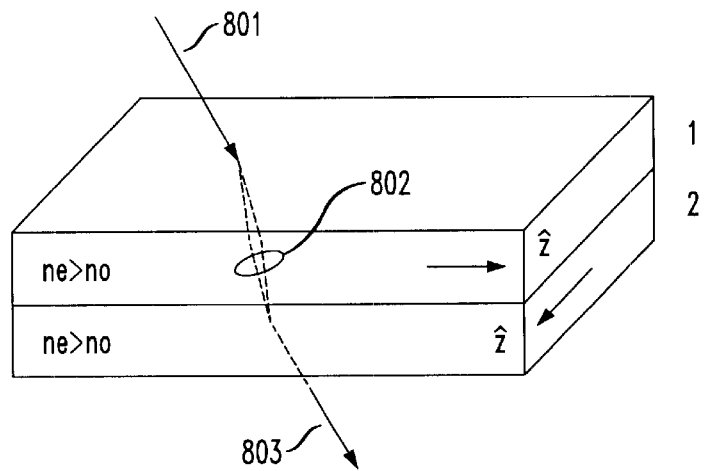
FIGS. 8a and 8b illustratively show the refraction of an input beam through two stacked birefringent plates having a 90° azimuthal rotation of the extraordinary axes.

Shown in FIG. 8a is a straightforward approach that was considered, in which two like birefringent crystals of equal length and cut as waveplates are stacked together with a 90° azimuthal rotation of the extraordinary axes. This construction will not work. Consider, without loss of generality, these crystals to be positive uniaxial. The split of the input beam 801 in the first crystal 802 is corrected by recombination in the second crystal. However, the fast and slow axes are interchanged from the first to second crystal, resulting in zero net DGD between the beams.

Figure 8B:
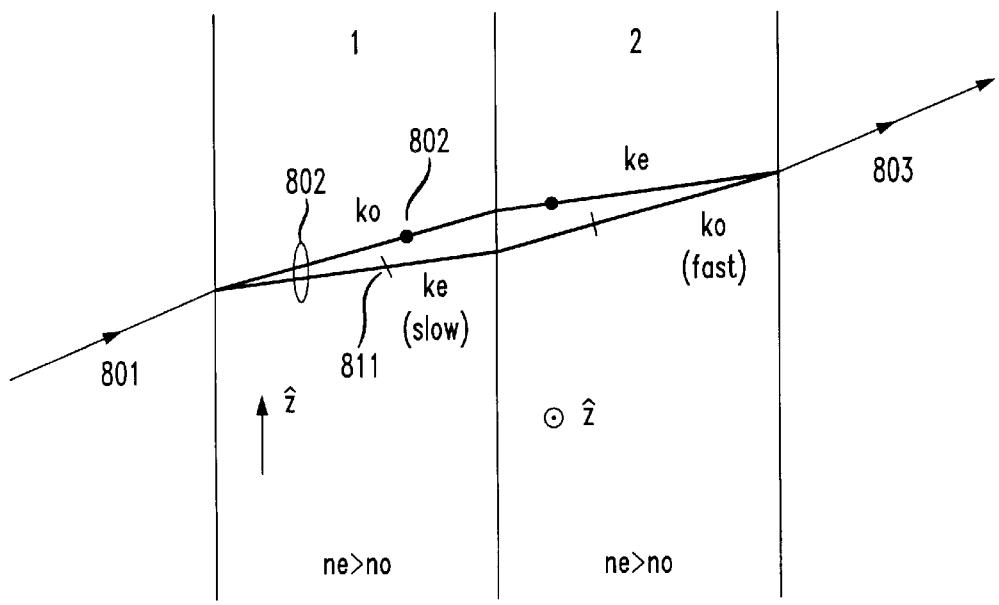

In detail, as shown in FIG. 8b, at the first crystal the input beam 801 with arbitrary SOP is resolved into the ordinary and extraordinary rays that refract at distinct angles 802. The e-ray 811 propagates along the slow axis, it being a positive uniaxial crystal, while the o-ray 810 propagates along the fast axis. The slow axis has the higher refractive index, therefore the k-vector of the refracted beam is declined towards the horizontal further than the k-vector for the fast axis. Through the length of the first crystal DGD is accrued. At the termination of the first crystal the two beams 802 are spatially separated.

Upon entrance to the second crystal with cross e-axis with respect to the first crystal, the beams 802 retain their linear polarization states by exchange their fast and slow designations. The e-ray of the first crystal becomes the o-ray in the second, thereby becoming the fast ray with inclination away from the horizontal. The o-ray of the first crystal becomes the e-ray in the second, thereby becoming the slow ray with declination towards the horizontal. After transit of the same crystal length, the two beams 802 reemerge coincident as beam 803. However, the DGD accrued in the first crystal was canceled by the second, thereby voiding the purpose of the crossed composite crystal design, when using like crystals.

Walk-Off Solution

Figure 9:
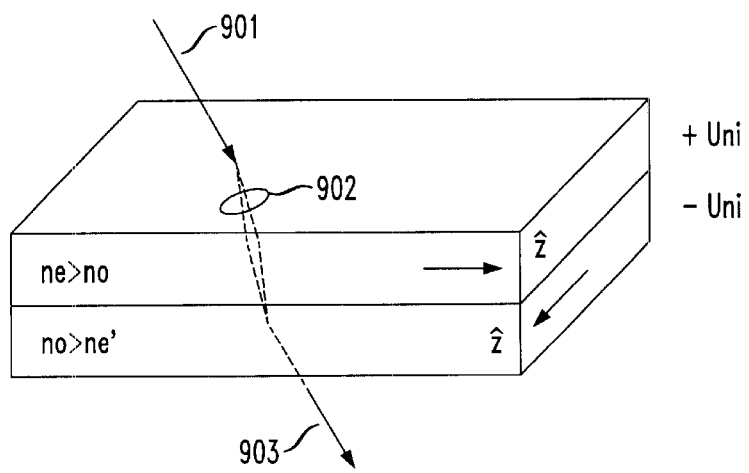
FIG. 9 illustrates two dissimilar birefringent crystals with e-axes orientated 90 degrees from one another.

The degree of freedom necessary to create a solution that exhibits zero net beam walkoff which accruing the requisite DGD is to flip the sign of the birefringence from the first crystal to the second. FIG. 9 illustrates two dissimilar birefringent crystals with e-axes orientated 90 degrees from one another. The first crystal 910 is designated positive uniaxial while the second crystal 911 is negative. Exchange of the birefringence sign between the two crystals is possible and does not change the following disclosure. input beam 901 refracts into two beams 902 upon entrance to first crystal 910. These divergent beams become convergent upon entrance to the second crystal 911. However, as in the case of FIG. 8, the exchange of ordinary and extraordinary axes does not exchange the "fast" and "slow" axes because the second crystal 911 has a flipped birefringence sign. Accounting for the birefringent sign change, the e-ray in the second crystal remains "fast" while the o-ray remains "slow". Thus DGD is accrued throughout transit of the composite crystal. Below is disclosed how to engineer the convergence of the beams in the second crystal 911.

Care must first be taken when considering the propagation of linearly polarized beams through birefringent media. Snell's Law dictates the refraction of the k-vector; the k-vector being perpendicular to the direction of the phase fronts of the propagating light and proportional to the phase velocity. In addition to the k-vector is the Poynting vector, which points in the direction of energy flow. In a uniaxial birefringent media, the k-vector and Poynting vectors are parallel when the linear polarization of the beam is either parallel or perpendicular to the extraordinary axis of the crystal. However, when the linear polarization of the beam has a component that lies in the direction of the extraordinary axis, the k- and Poynting vectors diverge. The indicatrix is a tool commonly used to represent the relation between the k- and Poynting vectors in birefringent media [Electromagnetic Wave Theory: J. Kong, John Wiley and Sons, 1986].

When linearly polarized light is incident on a birefringent interface where the e-axis is in the plane of the interface, the effective index experienced by the beam as it refracts into the crystal depends on the input SOP and the inclination direction of the beam. Table 1 summarizes the four possible cases: where the input (or incident) beam is inclined towards the o- and e-axis, and where the linear polarization appears as transverse electric (TE) or transverse magnetic (TM). The first three entries in Table 1 exhibit effective refractive indices that are purely ordinary or extraordinary. In these three cases the beam polarization is either parallel or perpendicular to the extraordinary axis. The fourth entry shows an effective index that is a mixture of the ordinary and extraordinary indices, depending on the in-crystal angle at which the beam propagates. The appropriate one of these four effective indices is to be used in Snell's Law of refraction to determine the k-vector direction.

Figure 10:
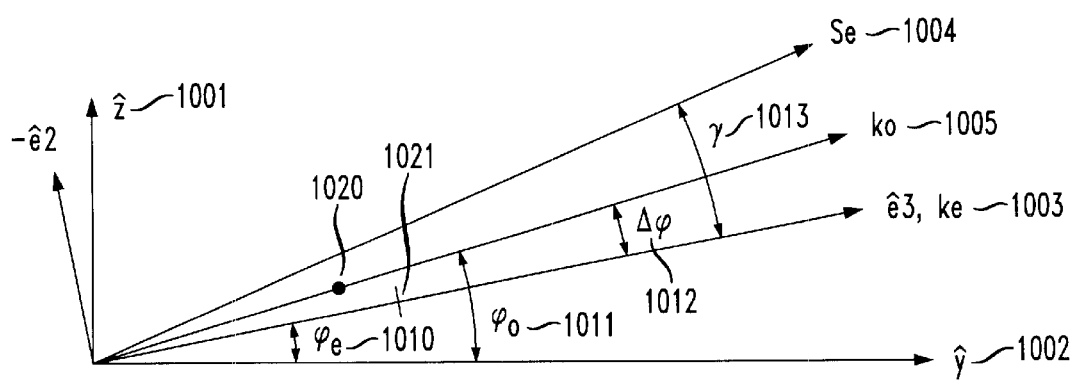
FIG. 10 shows the refraction of an input beam into a birefringent crystal with extraordinary axis direction.

FIG. 10 illustrates the refraction of an incident beam into a birefringent crystal with extraordinary axis direction 1001. The incident beam inclination is towards the e-axis. One thus expects k-vector and Poynting-vector splitting of the TM polarization component. The ordinary k-vector 1005 refracts at angle 1011 and, being that it's linearly polarization 1020 is perpendicular to 1001, the ordinary Poynting vector runs parallel to 1005. The extraordinary k-vector 1003, with linear polarization 1021, refracts at angle 1010, obeying the mixed effective index equation. Being that the e-ray polarization is partially directed towards the e-axis 1001, the k- and Poynting vectors split. The Poynting vector 1004 diverges from the k-vector at angle 1013, given in Table I. It is a rule for this type of k- and Poynting vector split that the extraordinary k- and Poynting vectors always bound the ordinary k- and Poynting vectors, regardless of whether the sign of the birefringence is positive or negative.

TABLE I

Effective Index for Inclination and Polarization

| Inclination | Polarization | Effective Index |
|---|---|---|
| o-axis | TM | $n_o$ |
| o-axis | TE | $n_e$ |
| e-axis | TE | $n_o$ |
| e-axis | TM | $\dfrac{n_o n_e}{\sqrt{n_e^2 \sin^2\varphi + n_o^2 \cos^2\varphi}}$ |

Poynting vector inclination from k-vector for e-axis TM:

$$\tan\gamma = \frac{(n_e^2 - n_o^2)\sin\varphi\cos\varphi}{(n_e^2 - n_o^2)\sin^2\varphi + n_o^2}$$

As the beams that emerge from the crystal are those along the lines of energy flow, it is the e- and o-Poynting vectors, which require ray tracing.

Figure 11:
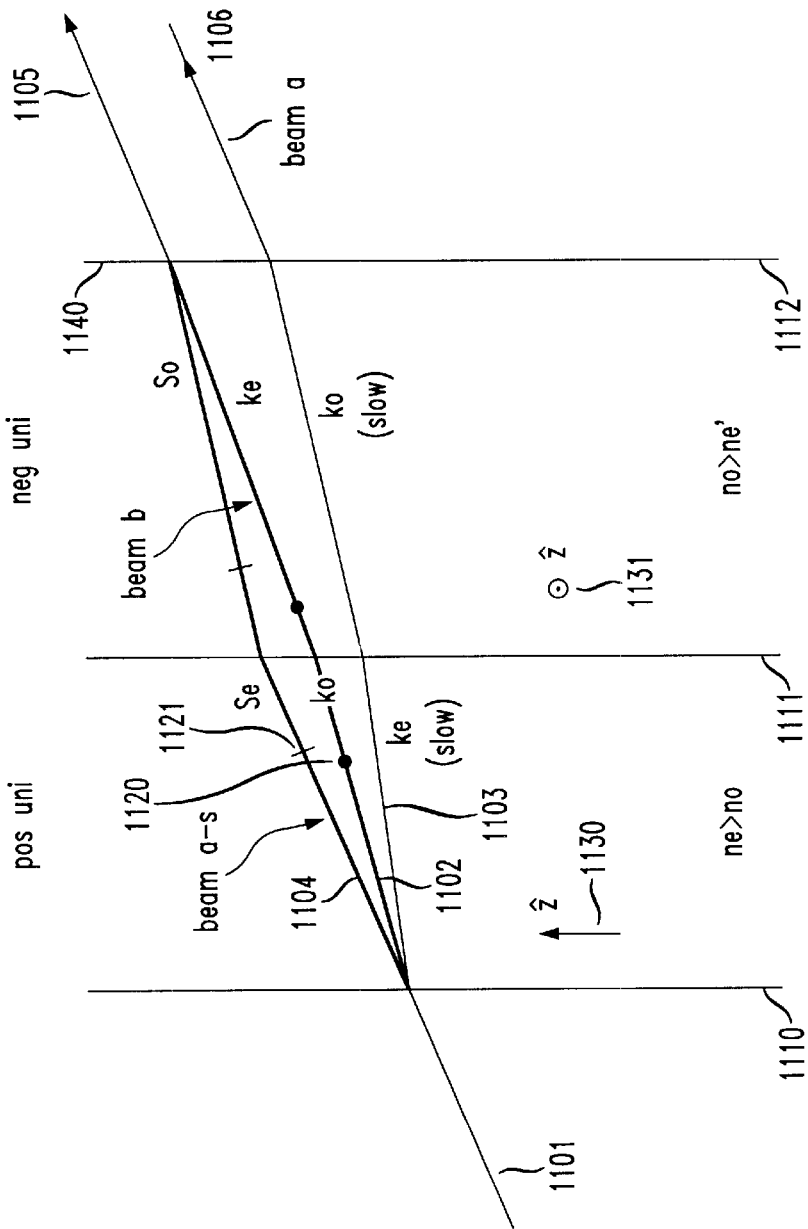
FIG. 11 illustrates the cross-section of the two-crystal arrangement of FIG. 9.

FIG. 11 illustrates the cross-section of the two-crystal arrangement of FIG. 9. There are three rays, identified as: beam b (the k- and Poynting vectors of the ordinary beam, coincident); beam a (the k-vector vector of the e-ray); and beam a-s (the Poynting vector of the e-ray). Such designations are useful as the properties of ordinary and extraordinary change throughout the composite crystal.

In FIG. 11, the incident beam 1101 is inclined away from the normal of interface 1110 in the direction of the extraordinary axis 1130 of the first, positive uniaxial, crystal. The beam 1101 is divided in two at the interface 1110: one k-vector, 1102, having linear polarization direction 1120 obeys Snell's Law as an ordinary wave; and the other k-vector, 1103, having linear polarization direction 1121 obeys Snell's Law as an extraordinary wave. Being a positive uniaxial crystal, the e-ray k-vector, 1103, is declined towards the normal more than the o-ray. Now, while the polarization state of the o-ray, 1102, is perpendicular to the extraordinary axis, the e-ray polarization state is not. The result is that the k-vector and Poynting vectors of the e-ray split. It is the nature of this splitting in a positive uniaxial crystal that the e-ray Poynting vector inclines further from the normal than the o-ray k- and Poynting vectors. The e- and o-ray Poynting vectors diverge, with the e-ray vector "above" the o-ray vector.

Entrance of the beams into the second crystal at interface 1111 has two effects. First, the ordinary and extraordinary axes are interchanged. Yet since the second crystal is negative uniaxial, the phase velocity of the original e-ray, now the o-ray, remains the slower. Temporal delay continues. Second, the polarization states of the beams are now either perpendicular or parallel to the extraordinary axis of the second crystal 931, so the Poynting and k-vectors of each beam run parallel. However, the k- and Poynting vectors of the e-ray from the first crystal are no longer coincident. Consideration of the relative refractive indices in the second crystal shows that the inclination of the original ordinary Poynting vector in the second crystal is greater than the inclination of the original extraordinary Poynting vector. The result is a converging course. The position of terminating interface 1112 is chosen at the point of convergence 1140.

Length Relation for Two-Element Composite Crystal

The equation which governs the ratio of lengths for the two birefringent crystals, for small incidence angles, is $$L_2/L_1 = \frac{n_{o2}}{n_{o1}} \frac{(n_{e1}/n_{o1} - 1)}{(n_{o2}/n_{e2} - 1)} \quad (1)$$

where $L_1$ and $L_2$ are the length of the first and second crystals, subscripts e and o refer to the pure ordinary or extraordinary refractive indices, and subscripts 1 and 2 designate the crystal.

Figure 12:
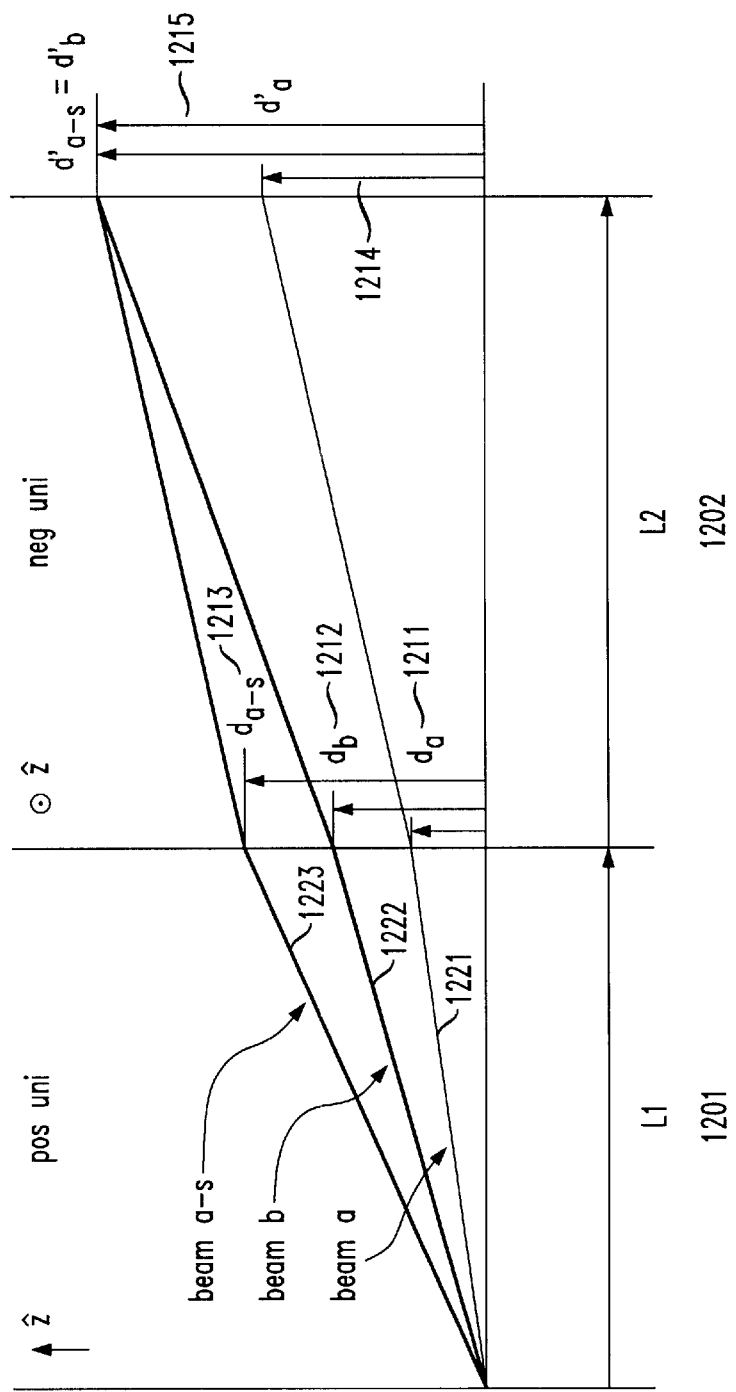
FIG. 12 shows the refraction and displacement of an input beam after transit through the two stacked birefringent plates of FIG. 9, which leads to Eq. (1)

FIG. 12 illustrates the ray-trace that leads to Eq. (1). Poynting vector beams 1222 and 1223, and k-vector beam 1221, propagate through the first crystal at distinct angles. Over length L1, 1201, the beams rise to elevations 1211, 1212, and 1213. These elevations are given as $$d_a(L_1) = L_1 \tan\phi_a^{(1)} \quad (2)$$

$$d_b(L_1) = L_1 \tan\phi_b^{(1)} \quad (3)$$

$$d_{a-s}(L_1) = L_1 \tan(\phi_a^{(1)} + \gamma) \quad (4)$$

where $d_a$, $d_b$, and $d_{a-s}$ refer to elevations 1211, 1212, and 1213, of beams 1221, 1222, 1223, respectively. The refraction angles φ are determined by Snell's Law by using the corresponding effective index listed in Table 1. The displacement angle γ is the splitting between the e-ray k- and Poynting vectors.

Upon entrance to the second crystal all beams change propagation angle as dictated by the crystal birefringence and the beam polarization state. Transit of the second crystal with length L2, 1202, yields a total elevation of Poynting vectors 1215 and of the offset k-vector 1214. These elevations are given as $$d_a(L_1+L_2) = d_a(L_1) + L_2 \tan\phi_a^{(2)} \quad (5)$$

$$d_b(L_1+L_2) = d_b(L_1) + L_2 \tan\phi_b^{(2)} \quad (6)$$

$$d_{a-s}(L_1+L_2) = d_{a-s}(L_1) + L_2 \tan\phi_a^{(2)} \quad (7)$$

The Poynting-vector beams converge when $d_{a-s}(L_1+L_2) = d_b(L_1+L_2)$. Together the above elevation equations lead to Eq. (1).

Finally, note that an effective index can be defined for the overall composite crystal by relating the total accumulated elevation to the sum length of the crystals. The following Eq. (8) is for small inclination angles:

$$n_{\mathit{eff-xtal}} = \left[\frac{L_1}{L_1+L_2}\left(\frac{1}{n_{o1}} + \frac{L_2/L_1}{n_{e2}}\right)\right]^{-1} \quad (8)$$

First-Order Temperature Independence

Two crystals of oppositely signed birefringence are necessary to find a zero net walkoff solution for inclined incident optical beams. Typically these two crystals combined are not temperature compensated to a first-order. To construct a composite crystal that has zero net beam walkoff and is also first-order temperature compensated, a first birefringent crystal, with complimentary properties, must be added. FIG. 13 illustrates a cross-section of three birefringent crystals. The first crystal has its extraordinary axis 1310 perpendicular to one or both of the remaining two extraordinary axes 1311 and 1312. The first crystal is also positive uniaxial while one or both of the remaining crystals must be negative uniaxial. Finally, the temperature coefficients of birefringence and expansion must be complimentary in such as manner as to provide a solution. The goal is to find a beam-convergent solution from input beam 1301 to output 1302 that is also first-order temperature compensated. A system of three equations of length L1, 1320, L2, 1321, and L3, 1322, is derived as follows.

The free-spectral range (FSR) of the composite crystal is calculated by $$FSR\,[\Delta n_1 L_1 \pm \Delta n_2 L_2 \pm \Delta n_3 L_3] = c \quad (9)$$

where the + sign is used when the adjacent extraordinary axes are aligned and the − sign is used otherwise. The constant c is the speed of light.

The first-order temperature dependence is governed by $$\frac{1}{FSR}\frac{dFSR}{dT} + \frac{FSR}{c}[\Delta n_1 L_1 K_1 \pm \Delta n_2 L_2 K_2 \pm \Delta n_3 L_3 K_3] = 0 \quad (10)$$

where T is temperature and the temperature coefficient K is defined as $$K = \frac{1}{\Delta nL}\frac{d\Delta nL}{dT} \quad (11)$$

and where Δn is the birefringence of the crystal. The selection of +/− sign follows that of Eq. (9).

Finally, the difference of inclination angle of the Poynting vectors within a single crystal is denoted by the symbol Ω. The system of equations to find the crystal lengths L1, L2, and L3, assuming a positive then two negative uniaxial crystals, is thus:

$$\begin{bmatrix} \Omega_1 & -\Omega_2 & -\Omega_3 \\ \Delta n_1 K_1 & -\Delta n_2 K_2 & -\Delta n_3 K_3 \\ \Delta n_1 & -\Delta n_2 & -\Delta n_3 \end{bmatrix} \begin{bmatrix} L_1 \\ L_2 \\ L_3 \end{bmatrix} = \begin{bmatrix} 0 \\ 0 \\ c/FSR \end{bmatrix} \quad (12)$$

As an example, Table 2 provides reported values for birefringence and temperature coefficients for three commonly available birefringent crystals. Note that other materials such as lithium niobate, crystalline quartz, rutile, and mica may also be utilized for the birefringent crystal. Table 3 lists the results of application of Eq. (12) using the values of Table 2.

TABLE 2

Reported Values

| Crystal | $\Delta n$ | K ($\times 10^{-6}$) | $\lambda$ |
|---|---|---|---|
| YVO$_4$ | +0.2039 | −22.5 | 1.55 μm |
| Calcite | −0.1744 | −37.5 | 1.55 μm |
| α-BBO | −0.0733 | +104 | 1.06 μm |

TABLE 3

Crystal Lengths

| Crystal | Length (mm) |
|---|---|
| YVO$_4$ | 8.8 |
| Calcite | 8.3 |
| α-BBO | 3.4 |
| Total | 20.5 |

FIGS. 14(a–b) illustrate the cross-section view of the complete folded birefringent filter utilizing the above-designed three-stage composite birefringent crystal of FIG. 13. FIG. 14a illustrates the same folded filter as FIG. 5a with the substitution of the single principal waveplate 501 with my composite birefringent crystal 1402. The composite crystal may be either two or three stages.

An input (or incident) optical beam 1401 is inclined from the horizontal so that, as the light travels through the filter cavity, a zig-zag pattern is formed. The CC-CPWP 1402 has its backside face mirror-coated 1404 and the QWP array 1403, too, has its backside mirror coated 1405 with the exception of the edge two plates 1406 and 1407. Quarter-wave waveplates are substituted for half-wave waveplates (HWP) because a full half-wave effect is generated via the double-pass through the QWP 1403. To account for the quarter-wave shortfall of edge plates 1406 and 1407, external QWPs 1408 and 1409 are added.

Thus, inclined input beam 1401 passes through first QWP 1409 and edge QWP 1407 and enters the cavity as beam 1411. Cavity beam 1411 is inclined with respect to the CPWP 1402 by angle 1420. The transit to and from the backside mirror 1404 generates the requisite one-pass DGD. Emergent beam 1412 is then incident on one element of the QWP array 1403, thereby rotating its SOP by a prescribed amount. Note that the length of crystals 1–3 is selected (in the manner described in FIG. 13) to produce beam-convergence of beam 1412. The backside mirror 1405 reflects beam 1412 back to the CPWP 1402 for additional passes. After the zig-zag transiting of the folded filter, the beam exits via edge QWP 1406 and QWP 1408, as a beam-converged output beam 1410.

The input beam 1401 may originate from an input fiber 1450 wherein the light emergent from the fiber is collimated by a first lens 1451. After transit of the folded filter, the output beam 1410 may be coupled by into another fiber 1452 by transit of a second lens 1453. In this manner, a fiber-to-fiber device is created.

Figure 14A:
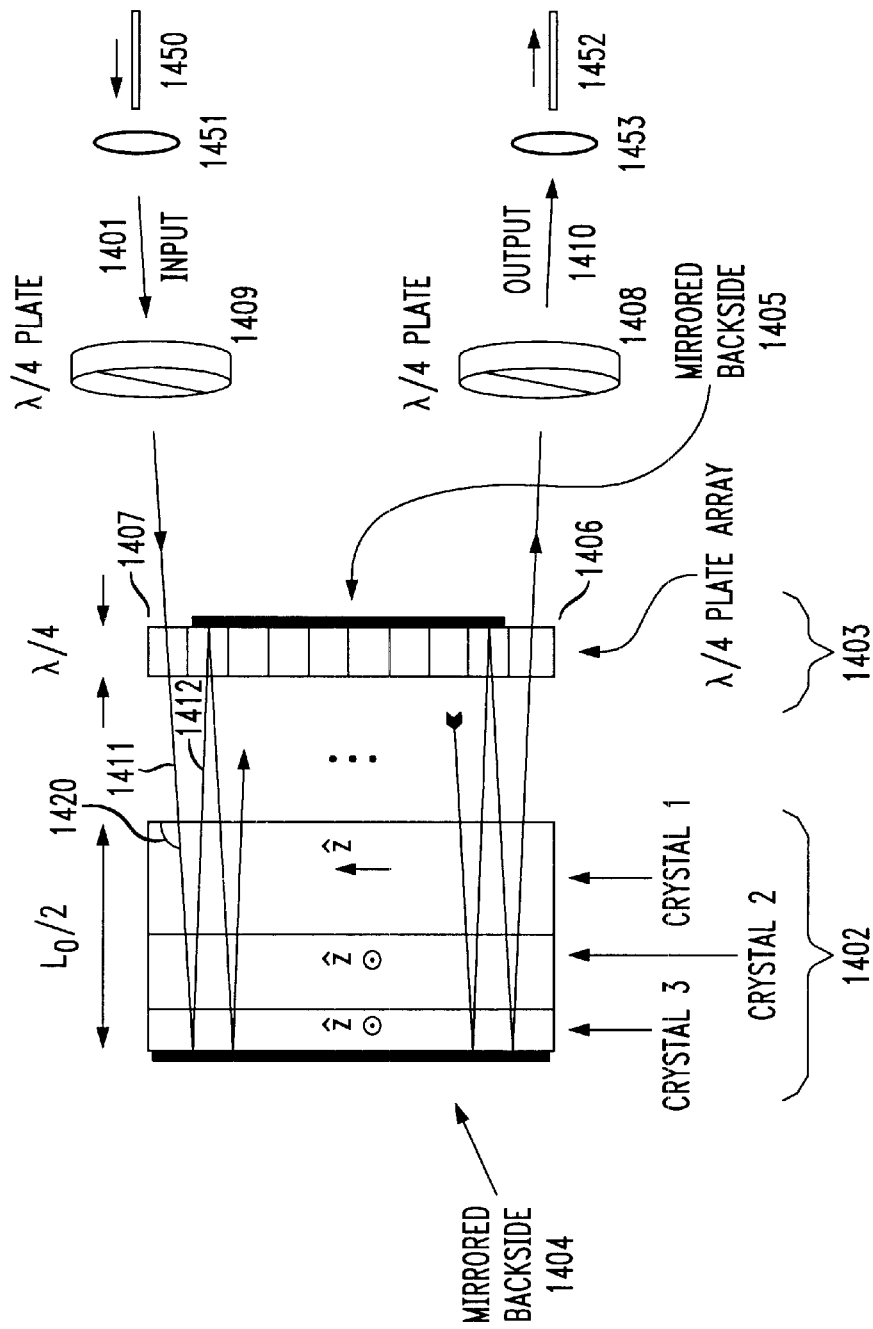
FIGS. 14a and b illustrate the cross-section view of the complete folded birefringent filter utilizing the above-designed three-stage composite birefringent crystal.
Figure 14B:
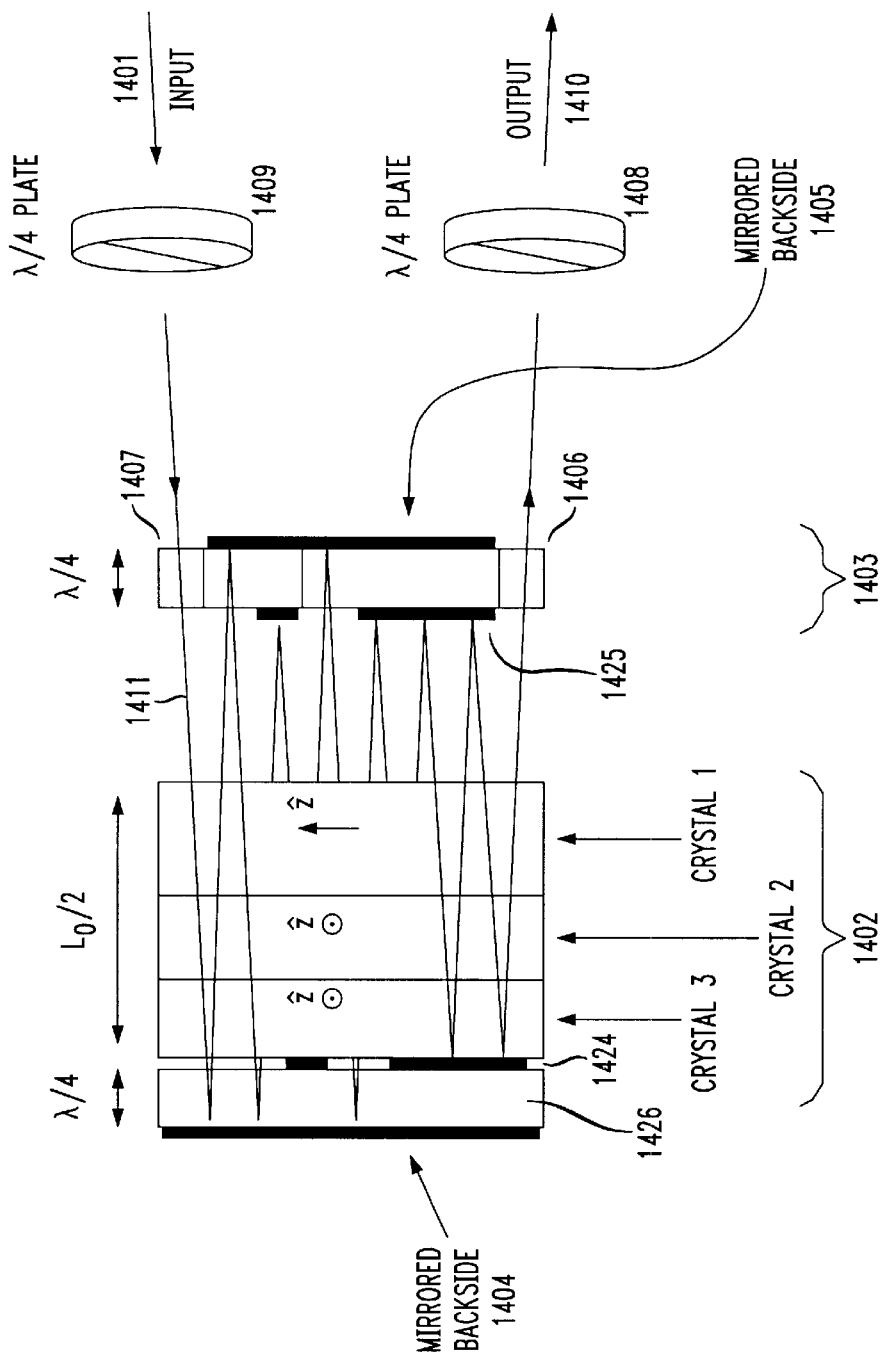

FIG. 14b illustrates the same folded filter as FIG. 6a with the substitution of the single principal waveplate 601 with my composite birefringent crystal 1402. The composite crystal may be either two or three stages. A cavity is formed between backside mirrors 1404 and 1405 with QWP array 1403, composite crystal 1402, and monolithic QWP 1426 inside the cavity. Unlike the folded filter of FIG. 14a, the folded filter of FIG. 14b adds additional segmented mirrors internal to the cavity. The segmented mirrors in planes 1424 and 1425 selectively block the optical beam from transit of the respective folded half-wave waveplates 1426 and 1403, respectively. The patterned mirrors in planes 1424 and 1425 function in the same manner as previously described in FIG. 6. The incident optical beam 1411 is inclined from the horizontal so that, as the light travels through the filter cavity, a zig-zag pattern is generated.

Figure 2:
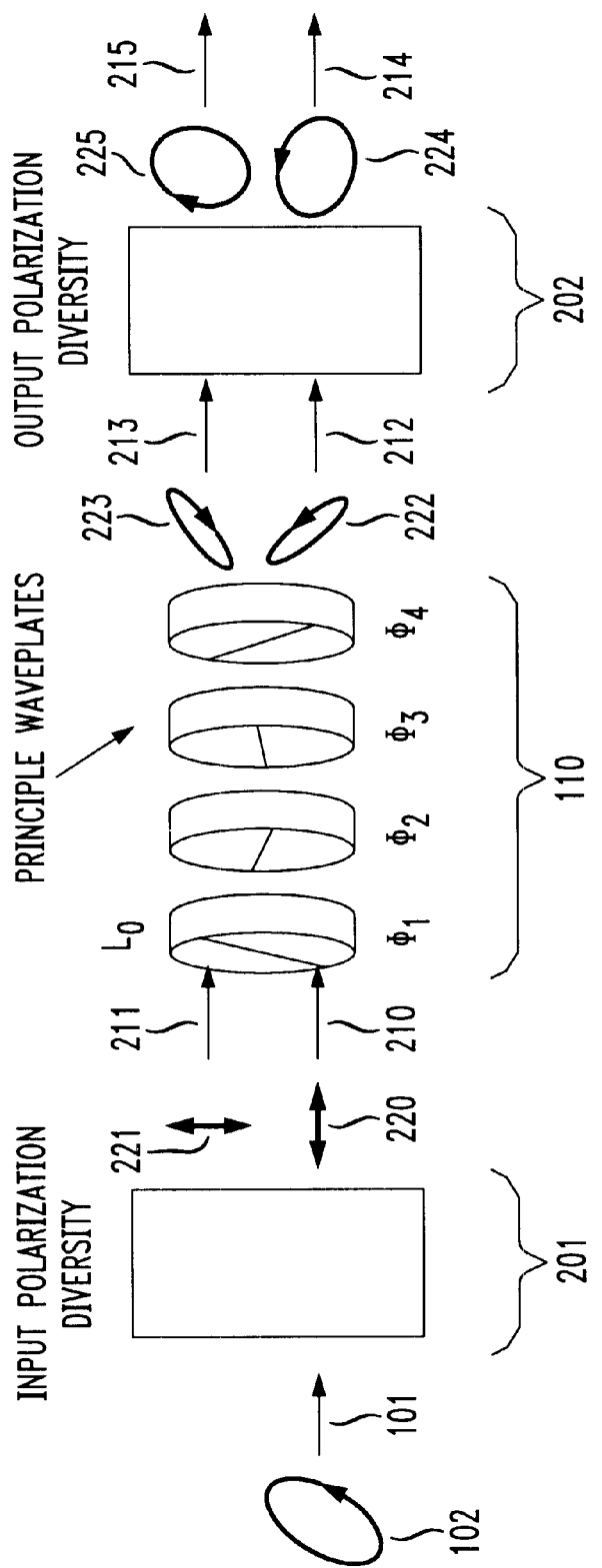
FIG. 2 shows an illustration of a prior art single-order cascaded birefringent filter with input and output polarization diversity.
Figure 14C:
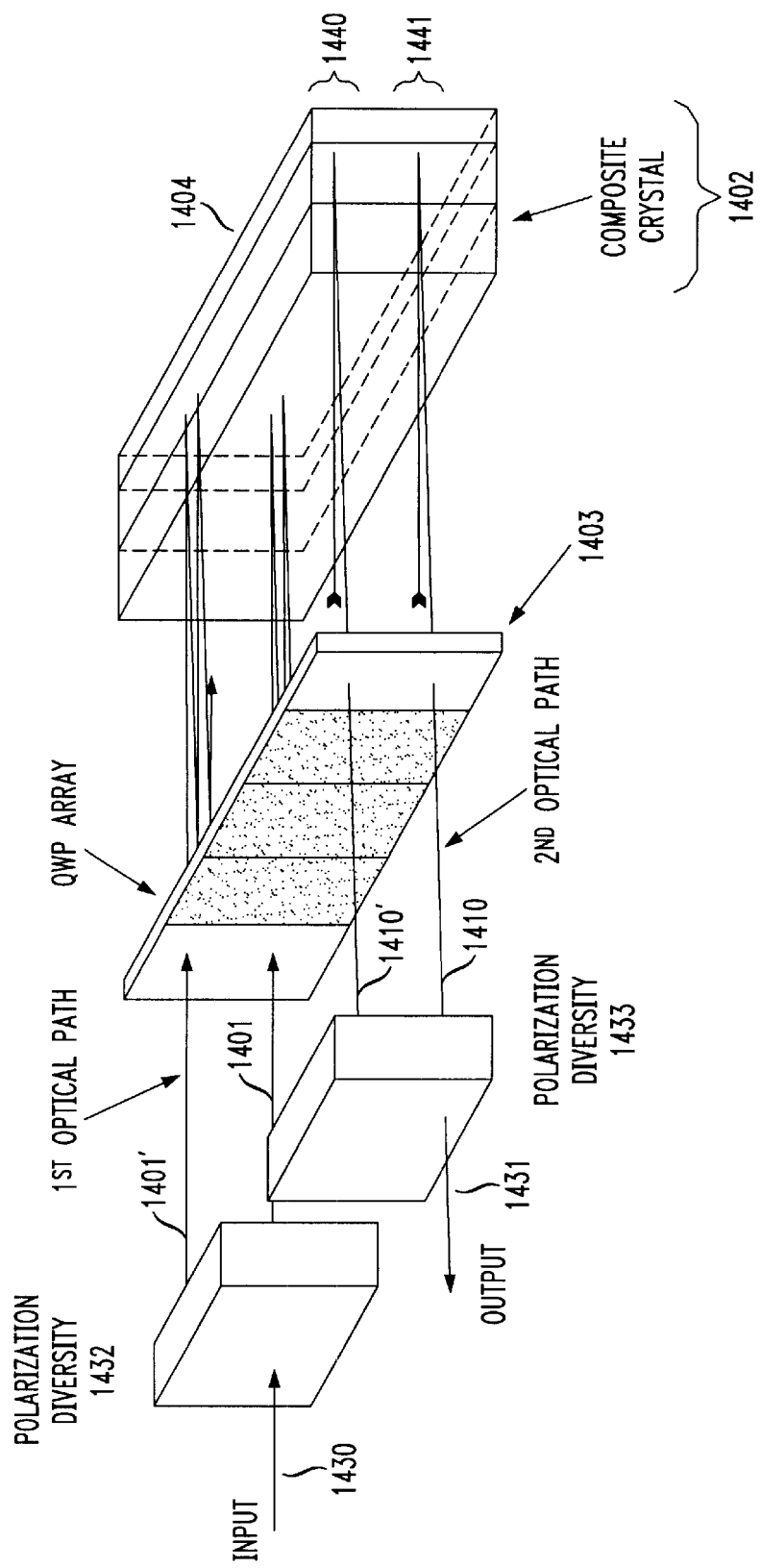
FIG. 14c illustrates one manner in which polarization diversity can be utilized in the present folded filter designs.

As illustrated in FIG. 2, a polarization diversity scheme is advantageous for the practical application of a birefringent filter. FIG. 14c illustrates one manner in which polarization diversity can be utilized in the present folded filter design. Beams 1401 and 1401' are generated by a polarization-diversity element 1432 from input beam 1430. Likewise output beam 1431 is generated from beams 1410 and 1410' by polarization-diversity element 1433. The beams 1401 and 1410, and the zig-zag path that connects said beams, lie in plane 1441. The complete path between 1401 and 1410 is the second optical path. The beams 1401' and 1410', and the zig-zag path which connects said beams, lie in plane 1440. The complete path between 1401' and 1410' is the first optical path. The planes 1440 and 1441 are parallel yet vertically offset. The optical beams which travel along the second optical path intersects and transits all elements of the folded filter, in the same order and with the same inclination angles, as does the first optical path. As such, the first and second optical paths are indistinguishable except for spatial displacement.

In another application, only one of the two said planes is utilized but where the second optical path is the same as the first optical path but with direction reversed. That is, the second optical path has input at beam 1410 and output at beam 1401. The order of intersection of the filter elements is reversed, but this is inconsequential.

Figure 14D:
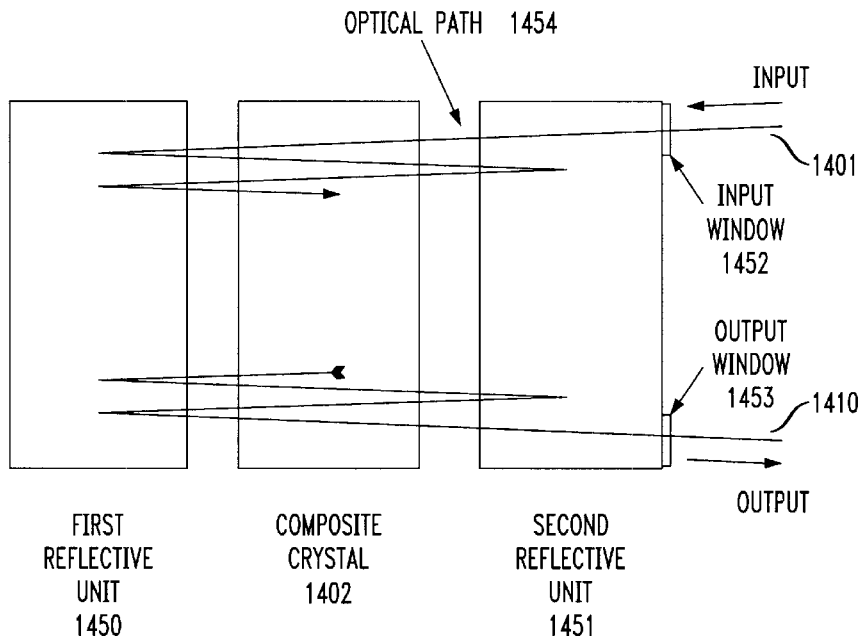
FIG. 14d illustrates the most general filter as three blocks: a first reflective unit, a composite crystal, and a second reflective unit.

While FIGS. 14a and 14b illustrate complete folded birefringent filters, variations of my technique may be applied to more simplified designs. Referring to FIG. 14d, the most general filter scheme is illustrated as three blocks: a first reflective unit 1450, a composite crystal 1402, and a second reflective unit 1451. The composite crystal is located between and oriented parallel with the first and second reflection surfaces. The specific points of reflection within reflective units 1450 and 1451 are intentionally not indicated in this schematic illustration, but reflection does take place somewhere within each reflective unit. Either a reflective unit can have a single surface which reflects an optical beam at all points or a reflective unit can have multiple reflective surfaces wherein at least one of the reflective surfaces may be segmented so as to transmit the optical beam to another reflective surface within the same reflective unit. In the case where multiple reflective surfaces exist, additional optical elements, such as a waveplate, may be added between the reflective surfaces.

In general, an input optical beam 1401 impinges on an input window 1452 that provides for transmission of the input optical beam into the cavity. Likewise, the output beam 1410 is transmitted through an output window 1453 which provides for transmission of the optical beam which travels the optical path 1454 from the interior of the cavity to the exterior.

Referring to FIG. 14*a*, the first and second reflective units correspond to the mirrored backsides 1404 and 1405, respectively. Referring to FIG. 14*b*, the first reflective unit corresponds to surfaces 1404 and 1424, and the second reflective unit corresponds to surfaces 1405 and 1425.

Continuous Tuning of Folded Filter

The optical architecture of the preceding folded crystal designs allows for a simple augmentation to provide for continuous tuning of the frequency response of the filter. Recall that the FSR of the any of the above described filters is determined exclusively by the optical length of the principal waveplate, herein realized by a composite birefringent crystal. The shape of the frequency response of determined exclusively by the sequence of orientations of waveplates located on the waveplate array. What remains to be specified is starting location in frequency of the FSR. The exact length of the composite birefringent crystal typically determines said starting location on the frequency axis. However, in practice one would like to retain control of the starting location. One method to retain such control is to be able to change the optical length of the composite crystal to within one wavelength.

Evans [2] described a means to provide for the equivalent of changing the optical length of a crystal to within one wavelength by utilizing a HWP located between a pair of QWPs. The QWPs are prescribed to be rotated 45 degrees about a reference axis perpendicular to the optical beam while the HWP is prescribed to be oriented at −45 degrees plus any offset. When the offset is zero, an optical beam which transits the three waveplates experiences no change. However, with a non-zero offset angle the transiting optical beam is shifted by up to one wavelength. Buhrer [3] demonstrated a configuration for continuously tunable birefringent filters, but in that disclosure each principal waveplate had to have a separate triplet of QWP, HWP, and QWP.

As the principal waveplate in the present disclose is the same for each filter stage, only one triplet of QWP, HWP, QWP is needed, thereby substantially simplifying a tunable filter design.

Figure 15:
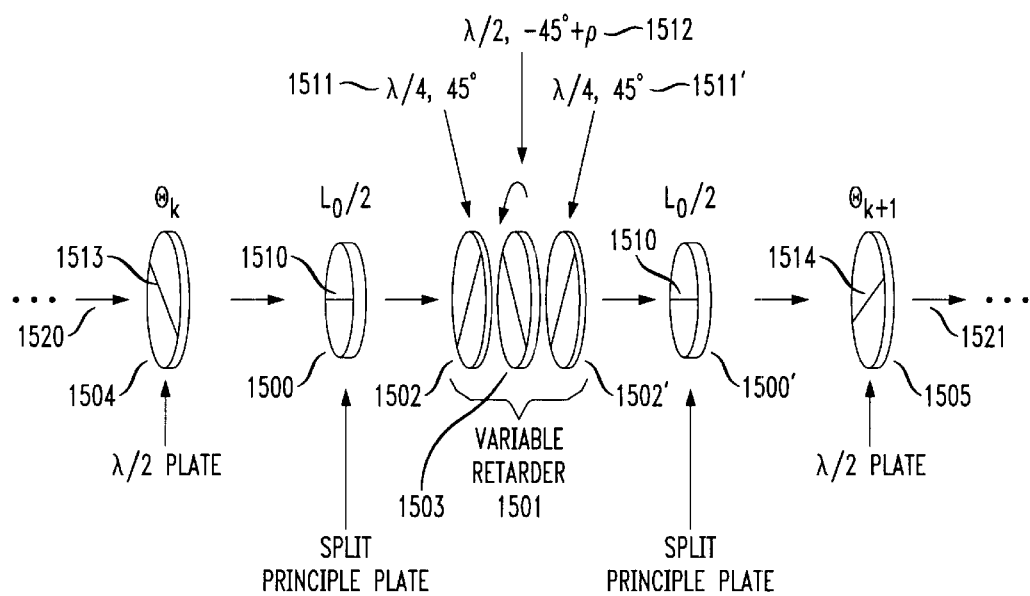
FIG. 15 shows a section of a single-order tunable unfolded filter including a variable retarder tuner.

FIG. 15 illustrates the location of a variable retarder 1501, comprising first QWP 1502, first HWP 1503, and second QWP 1502', placed at the center of two half-length principal waveplates (1500, 1500') which, together, form one principal waveplate. External to this assembly are a first and second HWPs 1504 and 1505. Thus, incident optical beam 1520 transits first HWP 1504, first half-length principal waveplate 1500, variable retarder 1501 comprising of first QWP 1502, first HWP 1503, and second QWP 1502', second half-length principal waveplate 1500', and second HWP 1505, finally to form output beam 1521. The orientation of the e-axis 1510 of the half-length principal waveplates is a reference and, without loss of generality, is drawn horizontal. The e-axes 1511, 1511' of the two QWPs 1502, 1502' are oriented at 45 degrees to 1510. The HWP 1503 with zero offset is oriented at −45 degrees to 1510. Finally, the e-axis orientations of HWPs 1504 and 1505, 1513 and 1514, are determined by the filter synthesis method. Rotation of the e-axis 1512 of HWP 1503 away from −45 degrees effectively changes the optical length of the variable retarder to within one wavelength. Since the rotation may be performed in a continuous manner, the tuning of the filter response is continuous.

Figure 16:
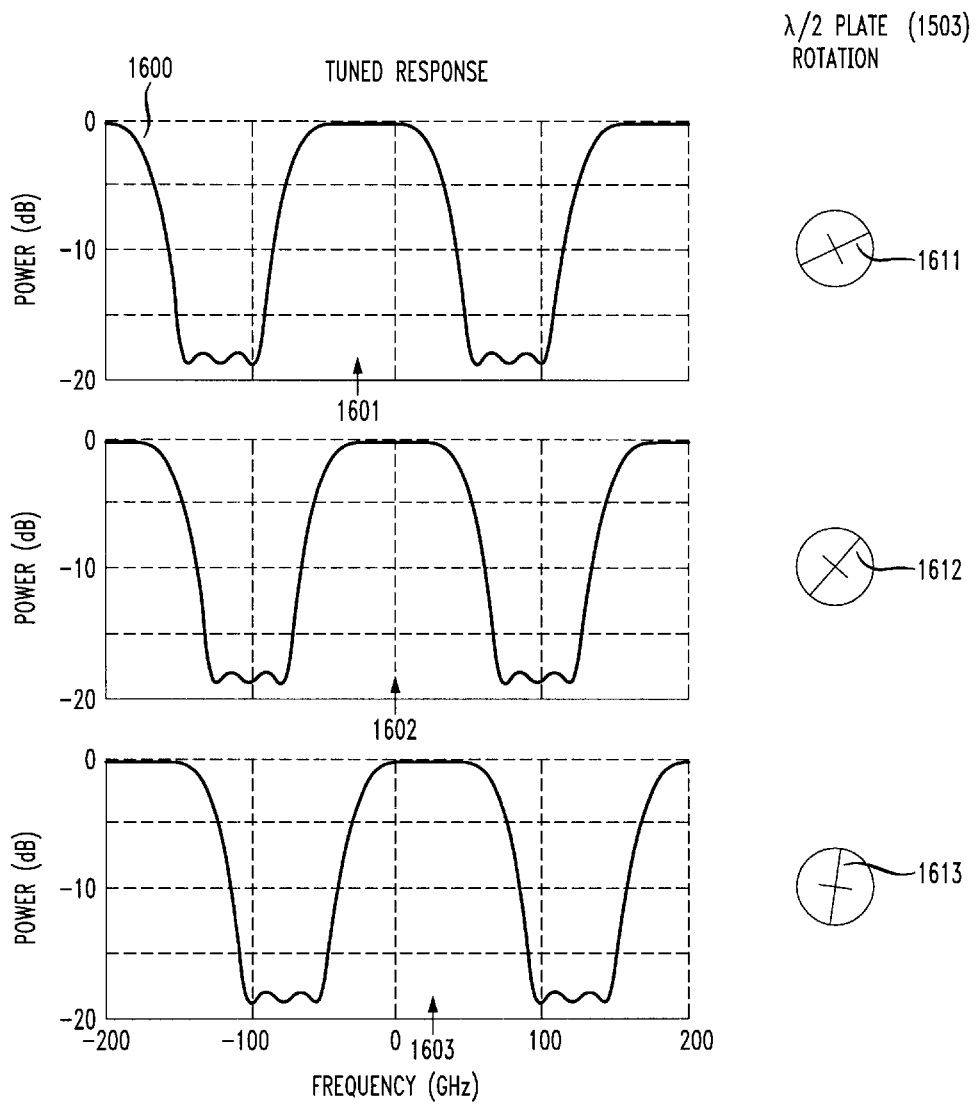
FIG. 16 illustrates representative intensity responses (at different orientations) of a folded filter as a function of frequency.

FIG. 16 illustrates a representative intensity response 1600 of a folded filter as a function of frequency. The intensity response is periodic with period length of one FSR. The FSR starting point, illustrated as point 1601, is determined by the composite crystal length. However, with the addition of the variable retarder is a manner described in the following, the intensity response 1600 shifts position on the frequency axis without changing either the FSR or the response shape. As HWP e-axis 1512 is rotated, the intensity response shifts; e.g. for orientation 1611 the FSR starting frequency is 1601, for orientation 1612 the FSR starting frequency is 1602, and for orientation 1613 the FSR starting frequency is 1603.

To realize the continuous FSR starting frequency tuning as illustrated in FIG. 16. FIG. 17*a* illustrates the inventive architecture. The folded filter architecture is that of FIG. 14*a* with two additional elements. A fixed QWP 1502 is located parallel to and behind the composite-crystal principal waveplate and a rotatable QWP 1700 is located parallel to and behind the fixed QWP 1502. The backside of the rotatable QWP 1700 is mirror-coated, thereby replacing the backside mirror coating of the composite crystal as illustrated in FIG. 14*a*. Since the backside of the rotatable QWP is mirror-coated, the optical beam double-passes said element, generating a half-waveplate equivalent. Moreover, since the optical beam double-passes the fixed QWP 1502, only one QWP is required rather than the two of FIG. 15, 1502 and 1502'.

FIG. 17*b* illustrates the relative e-axis orientations of the elements in the tunable folded filter. The principal waveplate 1710 has its e-axis at zero degrees, 1510. The fixed QWP 1711 has its e-axis at 45 degrees. The rotatable QWP 1712 has its e-axis at −45 degrees plus an offset. Finally, the waveplate array 1713 has various e-axis orientation as determined by the filter synthesis method.

APPENDIX

References

[1] B. Loyt, Comptes Rendus vol. 197, pp. 1593, 1933.
[2] J. Evans, J. Opt. Soc. Amer., vol. 39, no. 3, pp. 229, 1949.
[3] C. Buhrer, Applied Optics, vol. 33, no. 12, pp. 2249, 1994.
[4] U.S. Pat. No. 4,987,567, issued to C. Buhrer on Jan. 22, 1991.
[5] C. Buhrer, Applied Optics, vol. 27, no. 15, pp. 3166, 1988.
[6] S. Harris, J. Opt. Soc. Amer., vol. 54, no. 10, pp. 1267, 1964
[7] J. A. Kong, "Electromagnetic Wave Theory," John Wiley & Sons, 1986.

I claim:

1. A composite birefringent crystal comprising:
    a. a stack of two or more uniaxial birefringent crystals, each having front and back substantively parallel surfaces in which plane the crystalline extraordinary axis substantively lies and each located one behind the next with surfaces parallel, which receives an input optical beam that is non-normal to the front surface of a first crystal and produces from the back surface of a last crystal a first and second orthogonally polarized optical beams;
    b. where at least one crystal in the stack exhibits positive uniaxial birefringence;
    c. where at least one crystal in the stack exhibits negative uniaxial birefringence;
    d. where the extraordinary axis of said at least one positive uniaxial crystal and the extraordinary axis of said at least one negative uniaxial crystal have non-parallel alignment;

e. where with respect to the length of the first crystal, the ratio of the length of each of the remaining crystals of said stack to the length of the first crystal is selected to produce at the bottom surface of the last crystal
   i. zero net spatial displacement between first and second orthogonally polarized optical beams, and
   ii. temporal delay between first and second orthogonally polarized optical beams.

2. A composite birefringent crystal of claim 1 wherein:
   a. with respect to the length of the first crystal, the ratio of the length of each of the remaining crystals of said stack to the length of the first crystal is further selected to reduce the dependence of composite-crystal temperature on the spatial displacement and temporal delay between first and second orthogonally polarized optical beams.

3. A composite birefringent crystal of claim 1 wherein:
   a. the lengths of the crystals, while maintaining the selected length ratios, are further selected to generate a pre-determined free-spectral range.

4. A composite birefringent crystal of claim 1 wherein:
   a. the extraordinary axis of said at least one positive uniaxial crystal and the extraordinary axis of said at least one negative uniaxial crystal are aligned substantively perpendicular to one another.

5. A composite birefringent crystal of claim 1 is constructed from materials selected from a list of materials which includes: yttrium-orthovanadate, $YVO_4$, alpha-barium borate, $\alpha$-BBO, lithium niobate, calcite, crystalline quartz, rutile, and mica.

6. A composite birefringent crystal of claim 1 further comprising:
   a. a reflecting unit located adjacent to and parallel with the backside of the composite birefringent crystal so as to return the optical beams produced from the backside of the composite crystal to the backside of the composite crystal, producing thereby an optical beam from the front side of the composite crystal.

* * * * *